United States Patent
Wolff et al.

(10) Patent No.: US 9,245,226 B2
(45) Date of Patent: Jan. 26, 2016

(54) DETECTING CHANGE POINTS IN DATA STREAMS

(75) Inventors: Ran Wolff, Geva Carmel, IL (US); Murad Badarna, Arraba Village, IL (US)

(73) Assignee: CARMEL-HAIFA UNIVERSITY ECONOMIC CORPORATION LTD, Haifa (IL)

(*) Notice: Subject to any disclaimer, the term of this patent is extended or adjusted under 35 U.S.C. 154(b) by 304 days.

(21) Appl. No.: 13/876,446

(22) PCT Filed: Sep. 27, 2011

(86) PCT No.: PCT/IL2011/000764
§ 371 (c)(1),
(2), (4) Date: Jun. 14, 2013

(87) PCT Pub. No.: WO2012/042521
PCT Pub. Date: Apr. 5, 2012

(65) Prior Publication Data
US 2013/0262368 A1    Oct. 3, 2013

Related U.S. Application Data

(60) Provisional application No. 61/386,752, filed on Sep. 27, 2010.

(51) Int. Cl.
*G06N 5/02* (2006.01)
*G06F 17/00* (2006.01)
*G06K 9/00* (2006.01)
*G06N 99/00* (2010.01)
*G06F 17/18* (2006.01)

(52) U.S. Cl.
CPC *G06N 5/02* (2013.01); *G06F 17/18* (2013.01); *G06K 9/00496* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 2007/0082075 A1* | 4/2007 | Xu | 424/757 |
| 2011/0014625 A1* | 1/2011 | Belinsky et al. | 435/6 |
| 2011/0045053 A1* | 2/2011 | Shen et al. | 424/423 |

OTHER PUBLICATIONS

Kifer, D. et al. "Detecting change in data streams." Proceedings of the Thirtieth International Conference on Very Large Data Bases (VLDB)—vol. 30, pp. 180-191. 2004.*
Keogh et al; "An online algorithm for segmenting time series" Data Mining, 2001. ICDM 2001, Proceedings IEEE International Conference, pp. 289-296. (2001).
Charu C. Aggarwal et al; "A framework for diagnosing changes in evolving data streams" Proceedings of the 2003 ACM SIGMOD international conference on Management of data, SIGMOD '03, pp. 575-586. (2003).
Daniel Kifer et al; "Detecting change in data streams" Proceedings of the Thirtieth international conference on Very large data bases—vol. 30, pp. 180-191. (2004).
Murad Badarna et al; "Detecting Mean Changes in Data Streams"Data Mining Workshops (ICDMW), 2011 IEEE 11th International Conference, pp. 568-572. (2011).
International Search Report for PCT Patent Application No. PCT/IL2011/000764, Filed on Sep. 27, 2011.

* cited by examiner

*Primary Examiner* — Jeffrey A Gaffin
*Assistant Examiner* — Benjamin Buss
(74) *Attorney, Agent, or Firm* — Joseph G. Chu; JCIP

(57) ABSTRACT

A computerized method for detecting a change point in a data stream by testing whether two sets of samples from the data stream were derived from the same distribution, wherein the test uses the unique convergence properties of the two sample tests to probabilistically find the point which maximizes their value, said point closely approximating the change point.

16 Claims, 21 Drawing Sheets

DETECTING CHANGE POINTS IN DATA STREAMS

TECHNICAL FIELD

The present invention relates to analysis of computerized data streams in general, and in particular to a computerized method for detecting change points in data streams.

BACKGROUND ART

Modern computing technology enables to gather and process large quantities of data in a variety of fields such as finance, commerce, operations etc. In some cases, efficient and quick analysis of such high speed data streams can be very valuable in order to detect a change in trends or condition as early as possible. Click-through stream mining in e-commerce, where the goal of the application is to predict shopping behavior or the effect of advertising, is one notable example. Additional examples of high speed data streams include computerized production environment monitoring applications whose goal is failure detection, traffic monitoring applications that give driving recommendations or on-line alerts, and power grid applications for detecting changes in load profiles and forecast. In all those scenarios analysis is best done on-line, at the speed at which the data is arriving, as a delay in analysis would often translate into a delayed response which can be costly.

In almost each of these scenarios, the data streams are affected in one way or another by human behavior, which itself changes in response to the physical world (time of day or season), fashion, fads, psychological reasons, action by trendsetters, current events, or the economy. Any data stream analysis algorithm must therefore take into account and respond to the non-stationary nature of data distribution.

Furthermore, in many application domains, the change in the underlying distribution of the data is the most interesting event of all. In e-commerce, it can be the result of a change in the competitive scenario. In computerized environment monitoring, it can signal the spread of a new type of failure—such as a new computer virus. Lastly, in stock trading it may signal the move from a bull to a bear market or vice versa. Changes in the mechanism which generates the data are denoted concept drifts. They are especially important because they evoke a need for new responses, different from those dictated by models which were learned before the change occurred.

Most data streams mining algorithms acknowledge the need to handle concept drifts. Two approaches are prevalent: One is to discard old observations. The other is to relearn the model, or parts of the model, when a concept drift becomes evident. However, most data stream mining algorithms rely on a decline in the performance of the model as an indication for concept drift detection. This method, while sometimes effective, has no statistical backing and therefore can be expected to yield inferior results comparing to statistical based change point detection algorithms.

From a statistical point of view, the change point detection problem can be solved optimally by computing the prefix of the current sequence of samples which maximizes the probability that the suffix was sampled from a different distribution. This can be done subject to a set of assumptions on the distribution of the samples (e.g., that it is Normal) and of changes (e.g., that their arrival rate is Poissonian). This approach is, however, impractical for a large number of samples. The state of the art in statistical change point detection on data streams is therefore to use the Page-Hinkley test (PHT), whose run-time is linear in the number of samples. In a streaming setup that would mean maintaining a test statistic of constant size and performing $O(1)$ updates to it per new sample. Naturally, run-time performance like this can only be achieved at a significant cost in terms of false alarm rate, the number of samples needed to detect a change, and the accuracy at which the change point is detected.

The present invention relates to an alternative to PHT which relies on the best practice of solving the more informed problem of testing whether two sets of samples were derived from the same distribution. The algorithms of the invention make use of the unique convergence properties of two sample tests to probabilistically find the point which maximizes their value. That point closely approximates the change point. As both analysis and experiments show, the probabilistic algorithm of the invention maintains just $O(1)$ candidate change points and their related aggregate information. Therefore, it only requires $O(1)$ update operations per new sample, which is comparable with PHT. However, because the two sample tests used by the invention are much more powerful than PHT, and because the probabilistic algorithm of the invention does not degrade that power significantly, the algorithm of the invention is far better than PHT both in terms of false negative to false positive rate and in terms of the accuracy at which it locates to the change point. This superiority is further exemplified in a simplistic application in which the algorithm monitors the mean of a piece-wise stationary data stream at far better accuracy than the one achieved using PHT or others previous approaches.

Notations

Let $X_n = \{x_0, x_1, \ldots, x_n\}$ be a prefix of an open-ended stream of samples such that $x_i \in D$. For each point i in the prefix denote the samples $x_0, \ldots, x_{i-1}$ the head of the prefix and the samples $x_i, \ldots, x_n$ the tail of the prefix. When for some point in the stream the head and the tail follow different distributions that point is denoted $x_c$.

All of the tests described herein measure a test statistic on the stream and indicate a change whenever that statistic exceeds a user provided constant $\lambda$. The timeliness of a test is the minimal n larger than c at which the test statistic exceeds $\lambda$. The run length of a test is the n for which the test statistic first exceeds $\lambda$ even though no change occurred (i.e., n<c). Since the run length is dependent on random variations in the data we usually refer to the average run length (ARL), which is its average over multiple executions. In all of the algorithms discussed herein the test indicates not only the fact of the change but also the point $x_{max}$ at which it suspects the change occurred. The difference of that point from the actual change point, $|max-c|$, is the test accuracy.

Let f be a two sample test statistic, we denote $f_i(n)$ the same test statistic as applied to the head and the tail of a prefix of size n, relative to the $i^{th}$ point. We notice here that because $f_i(n)$ is not independent of either $f_i(n-1)$ or $f_j(n)$ for $j \neq i$ the original statistical meaning of f is lost. The test statistics retain, however, important convergence properties, as discussed further below.

The Page-Hinkley Test (PHT)

The Page-Hinkley test (PHT) is based on a concept of log-likelihood ratio. The key statistical property of this ratio is that a change in the mean of the data is reflected as a change in the sign of the mean value of the log-likelihood ratio. That is, the ratio exhibits a negative drift before the change, and a positive drift after the change. This difference in behavior is the key to detect the change.

PHT assumes that the observed samples follow a normal distribution. It also assumes that the true mean $\mu$ before change is known. This is usually not the case in real-life data, but it is possible to estimate the mean by averaging the observed samples.

Let $\mu_n$ denote the sample mean of the samples $x_0, x_1, \ldots, x_n$. PHT involves a cumulative variable $$U_n = \sum_{i=0}^{n} \left( x_i - \mu_n - \frac{\delta}{2} \right),$$

defined as the difference between the observed samples $x_i \in \{\mathbb{R}\}$ and their sample mean $\mu_n$ cumulated up to step n, where $\delta$ is a minimum change magnitude to be detected which is selected a priori. The minimum value $$m_n = \min_{0 \leq k \leq n} (U_k)$$

of this variable is also computed and updated on-line. The difference between the variable and its minimum value, $U_n - m_n$, is the test statistic that is monitored. When this difference is greater than the given threshold $\lambda$, the test alerts that an increase in the mean has occurred. Increasing $\lambda$ causes fewer false alarms, but might delay or miss altogether the detection of some change points. Given that a change is detected, the estimated change point, $x_{max}$, is the sample at which the minimum value $m_n$ was last obtained.

Since the mean can either decrease or increase, PHT can be executed twice to detect changes in both directions (see Alg.1).

---

Algorithm 1-Page-Hinkley Test (PHT)

Detection of an increase in the mean:

Define $U_n = \sum_{i=0}^{n} \left( x_i - \mu_n - \frac{\delta}{2} \right)$, $U_0 = 0$ Define $m_n = \min_{0 \leq k \leq n} (U_k)$ Alert when $U_n - m_n > \lambda$ Detection of a decrease in the mean:

Define $T_n = \sum_{i=0}^{n} \left( x_i - \mu_n + \frac{\delta}{2} \right)$, $T_0 = 0$ Define $M_n = \max_{0 \leq k \leq n} (T_k)$ Alert when $M_n - T_n > \lambda$

---

The $\chi$ Two-Sample Test

The $\chi^2$ two-sample test is a standard statistical tool for comparing two samples over the same categorical domain C. For two samples, one of size S, with $S_i$ samples in every category $C_i \in \mathbb{C}$ and the other of size R with $R_i$ samples respectively in every category $C_i \in \mathbb{C}$ the $\chi^2$ test requires that a simple statistic, Eq. 1, be computed.

$$\chi^2 = \sum_{j=1}^{|\mathbb{C}|} \frac{\left( \sqrt{S/R}\, R_j - \sqrt{R/S}\, S_j \right)^2}{R_j + S_j}. \quad (1)$$

The predominant characteristic of the $\chi^2$ test is that if the two samples are derived from the same (unknown) distribution, the statistic, itself a random variable, follows a known distribution—the $\chi^2$ distribution with $\mathbb{C} - 1$ degrees of freedom. If, on the other hand, the two samples come from distributions in which the mean of some categories are different, then the statistic tends to grow as the two samples grow.

When applied to the head and the tail of the prefix of a stream, as denoted above, the $\chi^2$ test statistic, $\chi_i^2$, can be rewritten according to Eq. 1 as:

$$\chi_i^2(n) = \sum_{j=1}^{|\mathbb{C}|} \frac{\left( \sqrt{i/(n-i)}\, R_j - \sqrt{(n-i)/i}\, S_j \right)^2}{R_j + S_j}. \quad (2)$$

For simplifying the explanation, we consider below the simple case in which there are only two categories. Applying the $\chi^2$ test for more than two categories directly generalizes the method of the invention, and can be applied by any person skilled in the art.

The Student's Two-Sample t-Test

Like the two sample $\chi^2$ test, the Student's two-sample t-test determines if the mean has changed between two samples. However, Student's t-test applies to real valued samples rather than categorical ones. Let $n_S$, $\hat{X}_{,S}$, and $v_S$ be the number of samples, the sample mean, and the unbiased estimator of the variance of one sample, and let $n_R$, and $\hat{X}_{,R}$ be the same aggregates for the other sample, respectively. The Student's t-test statistic is:

$$T = \frac{\hat{X}_S - \hat{X}_R}{\sqrt{\frac{v_S}{n_S} + \frac{v_R}{n_R}}}, \quad (3)$$

When the test is applied to the head and the tail of a prefix of a stream $T_i$ can be written as:

$$T_i(n) = \frac{\hat{X}_S - \hat{X}_R}{\sqrt{\frac{v_S}{i} + \frac{v_R}{n-i}}}. \quad (4)$$

The aggregates i, $\hat{X}_{,S}$, and $v_S$ require no update when a new sample is taken. The aggregates n, $\hat{X}_{,}^R$ and $v_R$ can be updates incrementally by using the aggregates $sumR_n$ and $sumR_n^2$. The sample mean $$\hat{X}_{+R} = \frac{1}{n-i-1} \sum_{j=i}^{n} x_j = \frac{sumR_n}{n-i-1}$$

where $sumR_n = sumR_{n-1} + x_n$. The unbiased estimator of the variance $v_R =$ $$\frac{1}{n-i-1}\sum_{j=i}^{n}x_j^2 - \frac{n-i}{n-i-1}(\hat{X}_R)^2 = \frac{sumR_n^2}{|n-i-1|} - \frac{n-i}{n-i-1}(\hat{X}_R)^2$$

where $sumR_n^2 = sumR_{n-1}^2 + x_n^2$.

The test is considered valid when each sample is indeed random, the samples are independent, and the samples follow a normal distribution with an unknown mean.

The predominant characteristic of Student's t-test is that if both samples are derived from the same unknown distribution, then the test statistic has a known distribution—Student's t distribution with the degrees of freedom calculated using $$\frac{(v_S/n_S + v_R/n_R)^2}{(v_S/n_S)^2/(n_S-1) + (v_R/n_R)^2/(n_R-1)}.$$

If, on the other hand, the two samples come from distributions in which the mean is different, then the value computed by the test statistic tends to grow with every increase in sample sizes.
Confidence Intervals on the Mean Let R be a sample of size n which follows the binomial distribution Bin (n, p). If $\hat{p}$ is the sample mean of R, then the normal approximation interval estimates that, with probability greater than $1-\alpha$, the value of p is in the range $$\hat{p} \pm Z_{1-\alpha/2}\sqrt{\frac{\hat{p}(1-\hat{p})}{n}}. \quad (5)$$

Here, $Z_{1-\alpha/2}$ denotes the $1-\alpha/2$ percentile of a standard normal distribution N (0, 1).

If R follows the normal distribution N ($\mu$, $\sigma^2$), and $\hat{p}$ and sd are the unbiased estimators of the mean and the standard deviation of R the approximation interval estimates that with probability greater than $1-\alpha$ the value of the actual mean $\mu$ is in the range:

$$\hat{p} \pm t^*_{1-\alpha/2}\frac{sd}{\sqrt{n}}. \quad (6)$$

Here, $t^*_{1-\alpha/2}$ denotes the $1-\alpha/2$ percentile of Student's t distribution.

SUMMARY OF INVENTION

It is an object of the present invention to present a computerized method for detecting a change point in a data stream.

It is another object of the present invention to present a computerized method for detecting a change point in a data stream by using a two-sample test on candidate points of the data stream.

The present invention thus relates to a computerized method for detecting a change point in a data stream by testing whether two sets of samples from the data stream were derived from the same distribution, wherein the test uses the unique convergence properties of the two sample tests to probabilistically find the point which maximizes their value, said point closely approximating the change point.

In some embodiments, the test used is the $\chi^2$ two-sample test.

In some embodiments, the method comprises the steps of:
(i) maintaining a list of candidate change points in the data stream, and relevant aggregate information;
(ii) adding each new point in the data stream as candidate;
(iii) computing an upper bound and a lower bound on the long term value of the $\chi^2$ two-sample test for every candidate in the list;
(iv) purging from the list candidates whose long term upper bound value is lower than the long term lower bound values of other candidates, with high probability; and
(v) indicating a change point when one candidate exceeds a given threshold.

In some embodiments, the relevant aggregate information comprises the number of points, number of occurrence of data from different categories or other statistics which can be incrementally updated with every new sample.

In some embodiments, the test used is the Student's t-test.

In some embodiments, the method comprises the steps of:
(i) maintaining a list of candidate change points in the data stream, and relevant aggregate information;
(ii) adding each new point in the data stream as candidate;
(iii) computing an upper bound and a lower bound on the long term value of the Student's-t two-sample test for every candidate in the list;
(iv) purging from the list candidates whose long term upper bound value is lower than the long term lower bound values of other candidates, with high probability; and
(v) indicating a change point when the test value for one candidate exceeds a given threshold.

In some embodiments, the aggregate relevant information comprises the number of point, sum of data, sum of the square of the data or other statistics which can be incrementally updated with every new sample.

In some embodiments, the test used is the mean estimation algorithm.

In some embodiments, the method comprises the steps of:
(i) maintaining the sum of the data and number of samples;
(ii) updating the said sum and number with every new data;
(iii) removing from said sum and number the sum and number of the data in the first set of the data for the candidate which indicates a change;
(iv) using the current sum and number to compute the average which is the estimation for the mean; and
(v) indicating a change point when the test value for one candidate exceeds a given threshold.

In some embodiments, the test used is any two-sample test.

In another aspect, the present invention relates to a non-transitory computer-usable medium having computer readable instructions stored thereon for execution by a processor to perform a computerized method for detecting a change point in a data stream by testing whether two sets of samples from the data stream were derived from the same distribution, wherein the test uses the unique convergence properties of the two sample tests to probabilistically find the point which maximizes their value, said point closely approximating the change point.

BRIEF DESCRIPTION OF DRAWINGS

FIG. 10a depicting cost vs. accuracy, while FIG. 10b depicting cost vs. timeliness.

DESCRIPTION OF EMBODIMENTS

Figure 1:
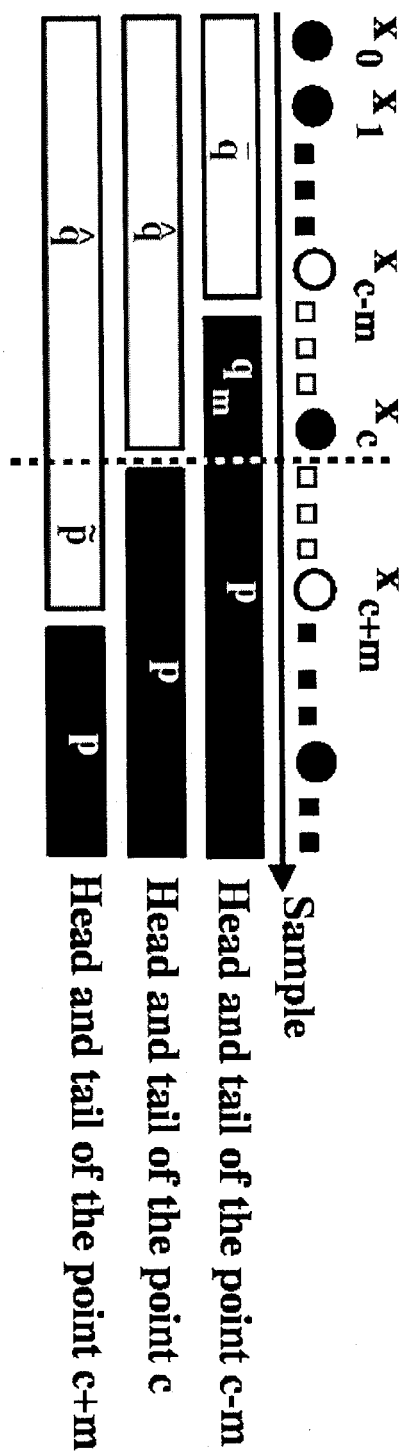
FIG. 1 shows three different points in a sequence: the change point c, c+m, and c−m.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Convergence Properties of $\chi_i^2(n)$ and $T_i(n)$

Below, the long-term behavior of $\chi_i^2(n)$ and $T_i(n)$ are observed as n grows toward infinity and it will also be shown how to induce an upper and a lower bound for the value to which both $\chi_i^2(n)$ and $T_i(n)$ will converge. The expected dominance of the change point statistic is also analyzed.

An Upper and a Lower Bound for the Projected Test Statistic

Assume that the samples of a stream follow the Bernoulli distribution and that the sample mean of the head of a point i is $\hat{q}$ while the actual mean of its tail is p. The $\chi^2$ test statistic for a point i has a useful convergence property: Since the sample mean of the tail tends to p as n grows, $\chi_i^2(n)$ will eventually tend to a constant which only depends on the difference of $\hat{q}$ from p and on the size of the head:

$$\lim_{n\to\infty} \chi_i^2(n) = \frac{(p-\hat{q})^2 i}{p(1-p)}. \tag{7}$$

Similarly, if the samples of a stream follow the normal distribution and the sample mean of the head of a point i is $\hat{X}_S$ while the actual mean of its tail is $\mu_R$ the Student's t-test statistic for a point i will eventually tend to a constant:

$$\lim_{n\to\infty} T_i(n) = (\hat{X}_S - \mu_R)\sqrt{\frac{i}{v_S}}. \tag{8}$$

Eq. 7 and Eq. 8 induce an upper and a lower bound for the value to which $\chi_i^2(n)$ and $T_i(n)$ will converge respectively. If at sample n the sample mean of the head of a point i is $\hat{q}$ and the average of its tail is $\hat{q}_n$, then by replacing p with the confidence interval in Eq. 5 we gain a confidence interval on the limit of $\chi_i^2(n)$. As a result, the maximal expected value (i.e., the upper bound), $\chi_i^u$, of $\chi_i^2(n)$ is $$\lim_{n\to\infty} \chi_i^2(n) \leq \chi_i^u = \max\left\{ \frac{\left(\hat{p}_n \pm Z_{1-\alpha/2}\sqrt{\frac{\hat{p}_n(1-\hat{p}_n)}{n}} - \hat{q}\right)^2 i}{\hat{p}_n(1-\hat{p}_n)} \right\}. \tag{9}$$

The minimal expected value (i.e. the lower bound), $\chi_i^l$ of $\chi_i^2(n)$ has two different cases. If $$\hat{q} \in \hat{p}_n \pm Z_{1-\alpha/2}\sqrt{\frac{\hat{p}_n(1-\hat{p}_n)}{n}}$$

then it might be as low as zero. Otherwise it is Eq. 10:

$$\lim_{n\to\infty} \chi_i^2(n) \geq \chi_i^l = \min\left\{ \frac{\left(\hat{p}_n \pm Z_{1-\alpha/2}\sqrt{\frac{\hat{p}_n(1-\hat{p}_n)}{n}} - \hat{q}\right)^2 i}{\hat{p}_n(1-\hat{p}_n)} \right\}. \tag{10}$$

Similarly, if at sample n $\hat{X}_S$ and $v_S$ are the sample mean and the unbiased estimator of the variance of the head respectively and $\hat{X}_n$ and $sd_n$ are the average and the standard deviation of the tail respectively, then replacing $\mu_R$ with the confidence interval in Eq. 6 we gain a confidence interval on the limit of $T_i(n)$. As a result, the maximal expected value, $T_i^u$, of $T_i(n)$ is $$\lim_{n\to\infty} T_i(n) \leq T_i^u = \max\left\{ \left(\hat{X}_S - \hat{X}_n \pm t_{\alpha/2}^* \frac{sd_n}{\sqrt{n}}\right)\sqrt{\frac{i}{v_S}} \right\}. \tag{11}$$

The minimal expected value, $T_i^l$, of $T_i(n)$ has two different cases. If $\hat{X}_S \in$ $$\hat{X}_n \pm t_{\alpha/2}^* \frac{sd_n}{\sqrt{n}}$$

then it might be as low as zero. Otherwise it is Eq. 12:

$$\lim_{n \to \infty} T_i(n) \geq T_i^l = \min\left\{ \left( \hat{X}_S - \hat{X}_n \pm t^*_{\alpha/2} \frac{sd_n}{\sqrt{n}} \right) \sqrt{\frac{i}{v_S}} \right\}. \quad (12)$$

Expected Dominance of the Change Point Statistic

Consider a sequence of samples coming from a piecewise stationary random source. Assume that this random source is binomial and at time c there is a change. Assume also that the samples before time c follows the binomial distribution Bin (c, q) and samples that come after time c follows the binomial distribution Bin (n–c, p). Consider three different points in that sequence: the change point c, c+m, and c–m (see FIG. 1).

Assume that at sample n the sample mean of the head for point c is $\hat{q}$ while its sample mean of its tail is $\hat{p}$. Since $\hat{p}$ tends to p as n grows, $\chi_c^2(n)$ will eventually tend to a constant according to Eq. 7.

Similarly, assume that the sample mean of the head for point c+m is $q_{c+m}$ while the sample mean of its tail is $p_{c+m}$. As can be seen in FIG. 1, $q_{c+m}$ contains samples from both distributions: Bin (c, q) with average $\hat{q}$ and Bin (m, p) with average $\tilde{p}$. It follows that $$q_{c+m} = \frac{c\hat{q} + m\tilde{p}}{c + m}.$$

Since, $p_{c+m}$ tends to p as n grows, $\chi_{c+m}^2(n)$ will eventually tend to a constant:

$$\lim_{n \to \infty} \chi_{c+m}^2(n) = \frac{\left( p - \left( \frac{c\hat{q} + m\tilde{p}}{c + m} \right) \right)^2 (c + m)}{p(1 - p)}. \quad (13)$$

Similarly, assume that the sample mean of the head for point c–m is $q_{c+m}$ while the sample mean of its tail is $p_{c-m}$. As can be seen in FIG. 1, $q_{c-m}$ contains samples from distribution Bin (c–m, q) with average $\bar{q}$. It follows that $q_{c-m} = \bar{q}$. Since, $p_{c-m}$ tends to p as n grows, $\chi_{c-m}^2(n)$ will eventually tend to a constant:

$$\lim_{n \to \infty} \chi_{c-m}^2(n) = \frac{(p - \bar{q})^2 (c - m)}{p(1 - p)}. \quad (14)$$

Now, consider the chances that $\chi_c^2(n)$ is dominated by either $\chi_{c+m}^2(n)$ or $\chi_{c-m}^2(n)$. For this to happen, Eq. 13 should be greater than Eq. 7. The resulting inequality has two roots: the first root occurs when $\tilde{p}$ is greater than $$p + 2\frac{c}{m}(p - \hat{q}):$$

Using the Hoeffding bound, it can be shown that this probability can be bounded from above by Eq. 15, which decreases exponentially as the proportion of $c^2$ to m increases. It follows that if the change occurs after a significant number of samples, then the change point statistic is likely to eventually dominate nearby points.

$$Pr\left( \lim_{n \to \infty} \chi_{c+m}^2(n) \geq \lim_{n \to \infty} \chi_c^2(n) \right) \underset{m \ll c}{\simeq} Pr\left( \tilde{p} > p + 2\frac{c}{m}(p - \hat{q}) \right) \quad (15)$$

$$= Pr(\tilde{p}m - pm > 2c(p - \hat{q}))$$

$$\leq e^{-\frac{8c^2(p - \hat{q})^2}{m}}.$$

The second root occurs when $\tilde{p}$ is lower than $p - \frac{1}{2}(p - \hat{q})$. Using the Hoeffding bound, it can shown that this probability can be bounded by Eq. 16, which decreases exponentially as m increases. Again, the chances that the change point statistic will dominate that of nearby points are overwhelming.

$$Pr\left( \lim_{n \to \infty} \chi_{c+m}^2(n) \geq \lim_{n \to \infty} \chi_c^2(n) \right) \underset{m \ll c}{\simeq} Pr\left( \tilde{p} < p - \frac{1}{2}(p - \hat{q}) \right) \quad (16)$$

$$= Pr\left( \tilde{p}m - pm < -\frac{1}{2}m(p - \hat{q}) \right)$$

$$\leq e^{-\frac{1}{2}m(p - \hat{q})^2}.$$

Point c–m can be similarly analyzed. Note that the first m samples in the tail of the point c–m follow the distribution Bin (m, p) and the c–m samples in its head follow the distribution Bin (c–m, q). Consider the chances that $\chi_c^2(n)$ is dominated by $\chi_{c-m}^2(n)$. For this to happen, Eq. 14 should be greater than Eq. 7. The resulting inequality has two roots: the first root occurs when $\bar{q}$ is greater than $2p - \hat{q}$. Using the Hoeffding bound, it can be shown that this probability can be bounded from above by Eq. 17, which decreases exponentially as c–m increases. Similarly, it follows that if the change occurs after a significant number of samples, then the change point statistic is likely to eventually dominate nearby points.

$$Pr\left( \lim_{n \to \infty} \chi_{c-m}^2(n) \geq \lim_{n \to \infty} \chi_c^2(n) \right) \underset{m \ll c}{\simeq} Pr(\bar{q} > 2p - \hat{q}) \quad (17)$$

$$= Pr(\bar{q}(c - m) - q(c - m) > (c - m)(2p - q - \hat{q}))$$

$$\leq e^{-2(c - m)(2p - q - \hat{q})^2}.$$

Similarly, the second root occurs when $\bar{q}$ is lower than $2q_m-p$, where $q_n$ is the average of the first m samples in the tail of point c−m. Using the Hoeffding bound, it can be shown that this probability can be bounded by Eq. 18, which decreases exponentially as c−m increases. Again, the chances that the change point statistic will dominate that of nearby points are overwhelming.

$$Pr\left(\lim_{n\to\infty}\chi^2_{c-m}(n) \geq \lim_{n\to\infty}\chi^2_c(n)\right) \underset{m\ll c}{\simeq} Pr(\tilde{q} > 2q_m - p) \quad (18)$$
$$= Pr(\bar{q}(c-m) - q(\tilde{c}-m) < (c-m)(2q_m - q - p))$$
$$\leq e^{-2(c-m)(2q_m - q - p)^2}.$$

Expected Dominance When No Change Occurs

Our analysis is also valid when no change occurs on the distribution of the random source. In this case, the greater the length of the head of a point, the closer $\hat{q}$ is to p. Consider, instead of c, the point max for which $|\hat{q}-p|$ is maximal. Now, Eqs. 15 to 18 can all equally be applied to the difference between $\chi^2_{max}(n)$ and $\chi^2_{max-m}(n)$, $\chi^2_{max+m}(n)$ with same consequences. It follows that even when no change occurs, one point is likely to dominate.

The analysis provided here has two limitations: first, it considers a single pair of points when in reality there are multiple interdependent points. Dependency among points could mean that if one point's statistic overshadow the statistic of c, so will the statistics of other points. However, central to our purpose is that the chances that any point would ever dominate the one which has the maximal $\chi^2$ value diminish exponentially with the distance between those points. Second, the analysis provided here is limited to the simpler test—the _2. Nonetheless, our experiments reveal no real difference between Student's t-test and the $\chi^2$ test and thus hint the analysis might hold for that test as well.

Change Point Detection Using the $\chi^2$ Two-Sample Test

The Probabilistic Test Optimization algorithm, ProTO-$\chi^2$, (see Alg. 2) maintains a set of candidate change points C. Every candidate i∈C has two pairs of aggregates: $S_i^0$ and $S_i^1$ for the head, and $R_i^0$ and $R_i^1$ for the tail. At every new sample $x_n$, the algorithm increases either $R_i^0$ or $R_i^1$ for every candidate i∈C, depending if $x_n$ is zero or one. Then, the algorithm recalculates $\chi_i^2(n)$ according to Eq. 2, and recalculates $\chi_i^l$, and $\chi_i^u$ according to Eq. 10 and Eq. 9, respectively, with $$\hat{q}_n \doteq \frac{S_i^0}{S_i^0 + S_i^1} \text{ and } \hat{p}_n \doteq \frac{R_i^0}{R_i^0 + R_i^1}.$$

Figure 2:
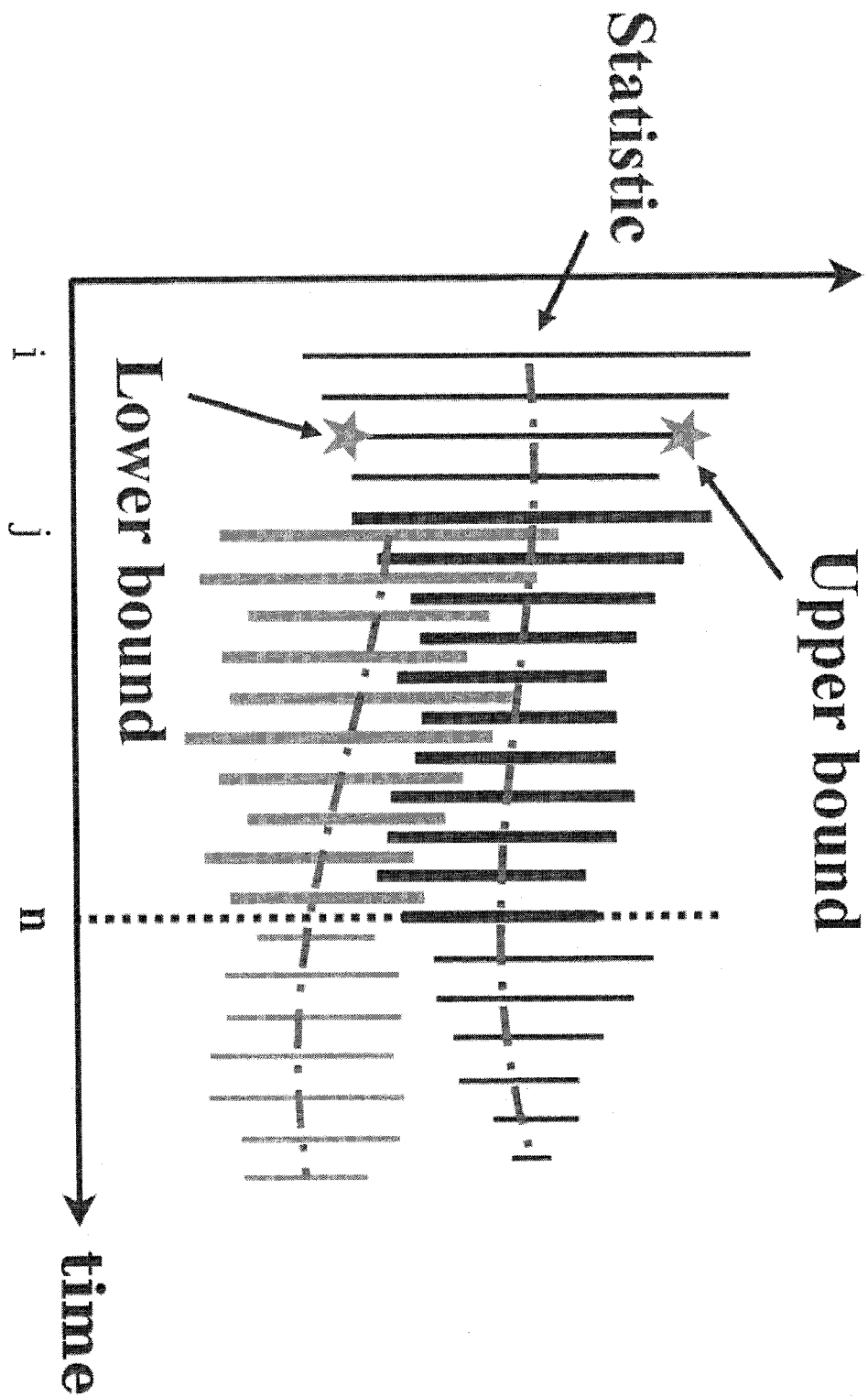
FIG. 2 is a graph showing projected test statistics.

The last step taken after every new sample $x_n$ is to update the candidate set. A new candidate is first added to C, whose tail aggregate is zero and whose head aggregates are the sums of the respective head and tail aggregates of one of the first candidate in C. Then, the algorithm reviews the candidate set and purges unneeded candidates according to the following criteria: Let max denote the candidate whose statistic, $\chi^2_{max}(n)$, is the highest among those in C. Also, let red denote the candidate whose lower bound statistic, $\chi^l_{red}$, is the highest lower bound in C. As can be seen in FIG. 2, and following the analysis above (in Expected dominance of the change point statistic), any candidate i∈C other than max, whose $\chi_i^u$ is below $\chi^l_{red}$ is expected to continue to have a lower statistic value than that of red. Therefore, it is redundant because, with high probability, red would indicate the change before i.

ProTO-$\chi^2$ retains any candidate i∈C whose $\chi_i^u$ is greater than $\chi^l_{red}$, as these are the candidates whose $\chi_i^2(n)$ might eventually exceed that of both candidates max and red. All the other candidates in C are then discarded. ProTO-$\chi^2$ also checks whether the candidate max has passed the threshold λ. If it has, an alert is indicated with the suspected change point indicated to be max.

---

Algorithm 2 The ProTO-$\chi^2$ Algorithm

---

Input:
  Alert threshold λ
  Confidence α
  Input stream $\{x_0, x_1, \ldots\}$
Data structure:
  A candidate set C where every i ∈ C has two pairs of aggregates $S_i^0$ and $S_i^1$ for the head and $R_i^0$ and $R_i^1$ for the tail.
  Initially C contains a dummy candidate −1 with $S_{-1}^0$, $S_{-1}^1$, $R_{-1}^0$, and $R_{-1}^1$ all set to zero.
Definitions:
  For every i ∈ C, $\chi_i^2(n)$ calculated according to Eq. 2, $\chi_i^l$, and $\chi_i^u$ are calculated according to Eqs. 10 and Eq. 9, respectively, with $$\hat{q}_n \doteq \frac{S_i^0}{S_i^0 + S_i^1} \text{ and } \hat{p}_n \doteq \frac{R_i^0}{R_i^0 + R_i^1}.$$

$$\text{max} \doteq \arg\max_{i \in C} \{\chi_i^2(n)\}$$

$$\text{red} \doteq \arg\max_{i \in C} \{\chi_i^l\}$$

first := min {i ∈ C}
At the arrival of sample $x_n$:
1. Let $S_n^0 \leftarrow S_{first}^0 + R_{first}^0$ and $S_n^1 \leftarrow S_{first}^1 + R_{first}^1$
2. Let C ← C ∪ {n}
3. Let max ← first and red ← first
4. For every i ∈ C
  (a) Increment $R_i^0$ if $x_n = 0$ or increment $R_i^1$ if $x_n = 1$
  (b) Recalculate $\chi_i^2(n)$, $\chi_i^l$, and $\chi_i^u$
  (c) If $\chi_i^2(n) > \chi^2_{max}(n)$ then max ← i
  (d) If $\chi_i^l > \chi^l_{red}$ then red ← i
5. If $\chi^2_{max}(n) > \lambda$ then indicate of a possible change at sample max
6. For every i ∈ C
  (a) If i ≠ max and $\chi_i^u < \chi^l_{red}$ then C ← C\{i}

---

Change Point Detection Using the Student's t-Test

ProTO-T (see Alg. 3) is very similar to ProTO-$\chi^2$. The main difference is in the aggregates it maintains for every candidate, and the statistic computed for everyone. Every candidate i∈C has two pairs of aggregates: $sumS_i$ and $sumS_i^2$ for the head, and $sumR_i$ and $sumR_i^2$ for the tail. At the arrival of new sample $x_n$ all the aggregates in the tail of candidate i are updated as follows: $sumR_i \leftarrow sumR_i + x_n$ and $sumR_i^2 \leftarrow sumR_i^2 + (x_n)^2$. Similar to ProTO-$\chi^2$, ProTO-T also recalculates for every candidate i, $T_i(n)$ according to Eq. 4, and recalculates, $T_i^l$, and $T_i^u$ according to Eq. 12 and Eq. 11, respectively, with $\hat{X}_n \doteq \hat{X}_{,R}$ and $sd_n \doteq \sqrt{vR}$.

At every new sample $x_n$, ProTO-T also creates a new candidate and adds it to the set C. The tail aggregates of the new candidate are empty and its head aggregates is the sums of the respective head and tail aggregates of the first candidate in C, which are computed as follows: $sumS_i \leftarrow sumS_{first} + sumR_{first}$ and $sumS_i^2 \leftarrow sumS_{first}^2 + sumR_{first}^2$ (it should be noted that the sum of $sumS_i$ and $sumR_i$ is the same for all i, as is the sum of $sumS_i^2$ and $sumR_i^2$). Then, the algorithm locates the candidates max, with the maximal $T_{max}(n)$ value, and red, whose $T_{red}^l$ is maximal, and purges redundant candidates in the same way ProTO-$\chi^2$ does. Finally, ProTO-T indicates a change at max if $T_{max}(n)$ surpasses $\lambda$.

---

Algorithm 3 The ProTO-T Algorithm

---

Input:
  Alert threshold $\lambda$
  Confidence $\alpha$
  Input stream $\{x_0, x_1, \ldots\}$
Data structure:
  A candidate set C where every $i \in C$ has two pair of aggregates: $sumS_i$ and $sumS_i^2$ for the head, $sumR_i$ and $sumR_i^2$ for the tail.
  Initially C contains a dummy candidate $-1$ with $sumS_{-1}$, $sumS_{-1}^2$, $sumR_{-1}$, and $sumR_{-1}^2$ all set to zero.
Definitions:
  For every $i \in C$, $T_i(n)$ calculated according to Eq. 4, $T_i^l$, and $T_i^u$ are calculated according to Eq. 12 and Eq. 11, respectively, with $\bar{X}_n \doteq \bar{X}_R$ and $sd_n \doteq \sqrt{v_R}$ $$\max \doteq \arg\max_{i \in C}\{T_i(n)\}$$

$$\text{red} \doteq \arg\max_{i \in C}\{T_i^l\}$$

first $\doteq \min\{i \in C\}$
At the arrival of sample $x_n$:
1. Let $sumS_i \leftarrow sumS_{first} + sumR_{first}$, and $sumS_i^2 \leftarrow sumS_{first}^2 + sumR_{first}^2$
2. Let $C \leftarrow C \cup \{n\}$
3. Let max $\leftarrow$ first and red $\leftarrow$ first
4. For every $i \in C$
  (a) $sumR_i \leftarrow sumR_i + x_n$ and $sumR_i^2 \leftarrow sumR_i^2 + (x_n)^2$
  (b) Recalculate $T_i(n)$, $T_i^l$, and $T_i^u$
  (c) If $T_i(n) > T_{max}(n)$ then max $\leftarrow$ i
  (d) If $T_i^l > $ and $T_{red}^l$ then red $\leftarrow$ i
5. If $T_{max}(n) > \lambda$ then indicate of a possible change at sample max
6. For every $i \in C$
  (a) If $i \ne $ max and $T_i^u < T_{red}^l$ then $C \leftarrow C\setminus\{i\}$

---

The Mean Estimation Algorithm

Computation of the mean in various scenarios is often used as a toy example, a demonstrator, in data mining. Valuable in itself, this example is also strongly related to a family of clustering algorithms—k-means. In the context of change point detection, we are interested in the benefits of ProTO for mean estimation in piecewise stationary streams. Building on the algorithmic framework of ProTO, the ProTO-Mean algorithm computes an approximation of the mean as the average of all samples seen since the last change.

The main difference between the ProTO-T and the ProTO-Mean algorithms is on line 5: whenever an alert is identified, the ProTO-Mean algorithm treats all of the samples that preceded the indicated change point as if they came from a different distribution. Thus, candidates generated before the indicated change point are discarded. Candidates generated at and after the suspected change point must have the aggregates of the samples gathered before the change point discarded from their head. Since these aggregates are exactly the head aggregates of the candidate which produced the alert, the ProTO-Mean algorithm simply deducts the head aggregates of max from the head aggregates of every candidate. Since ProTO-Mean treats all candidates that preceded at and after the suspected change point as if they created after the suspected change point, it deducts max from every candidate i (see line 5(b)iii). Furthermore, the output of ProTO-Mean is the percentage of the sample mean of the head and the sample mean of the tail of any candidate (see, Alg. 4).

---

Algorithm 4 ProTO-Mean Algorithm

---

Input: Same as for Alg. 3
Data structure: Same as for Alg. 3
Definitions: Same as for Alg. 3
Output:

$$\frac{sumS_{first} + sumR_{first}}{n}.$$

At the arrival of sample $x_n$:
1. Let $sumS_i \leftarrow sumS_{first} + sumR_{first}$, and $sumS_i^2 \leftarrow sumS_{first}^2 + sumR_{first}^2$
2. Let $C \leftarrow C \cup \{n\}$
3. Let max $\leftarrow$ first and red $\leftarrow$ first
4. For every $i \in C$
  (a) $sumR_i \leftarrow sumR_i + x_n$ and $sumR_i^2 \leftarrow sumR_i^2 + (x_n)^2$
  (b) Recalculate $T_i(n)$, $T_i^l$, and $T_i^u$
  (c) If $T_i(n) > T_{max}(n)$ then max $\leftarrow$ i
  (d) If $T_i^l > T_{red}^l$ then red $\leftarrow$ i
5. If $T_{max}(n) > \lambda$ then
  (a) Remove every candidate $i <$ max from C
  (b) For every $i \in C$ such that $i \ge $ max
    i. $sumS_i \leftarrow sumS_i - sumS_{max}$
    ii. $sumS_i^2 \leftarrow sumS_i^2 - sumS_{max}^2$
    iii. $i \leftarrow i - $ max
6. Else
  (a) For every $i \in C$
    (i) If $i \ne $ max and $T_i^u < T_{red}^l$ then $C \leftarrow C\setminus\{i\}$

---

ProTO-Mean can be compared with an adaptation of PHT for mean estimation. Whenever an alert is indicated, the PHT-Mean algorithm treats all of the samples that preceded the indicated change point as if they came from a different distribution. Thus, PHT-Mean is restarted whenever a change is detected. The output of PHT-Mean is the percentage of the sample mean $\mu_n$ (see Alg. 5).

---

Algorithm 5 The PHT-Mean Algorithm

---

Input: Same as for Alg. 1
Data structure: Same as for Alg. 1
Definitions: Same as for Alg. 1
Output:
  $\mu_n$.
  Let $c \leftarrow 0$
At the arrival of sample $x_n$:

$$U_n = \sum_{i=c}^{n}\left(x_i - \mu_n - \frac{\delta}{2}\right)$$

$$m_n = \min_{c \le k \le n}(U_k)$$

If $U_n - m_n > \lambda$ then $c \leftarrow n$ $$T_n = \sum_{i=c}^{n}\left(x_i - \mu_n + \frac{\delta}{2}\right)$$

$$M_n = \max_{c \le k \le n}(T_k)$$

If $M_n - T_n > \lambda$ then $c \leftarrow n$

---

Experimental Validation

In this section, we conducted a series of experiments comparing the average run length, the accuracy, the timeliness and the cost of ProTO to those of PHT.

Typical Experiment

Figure 3A:
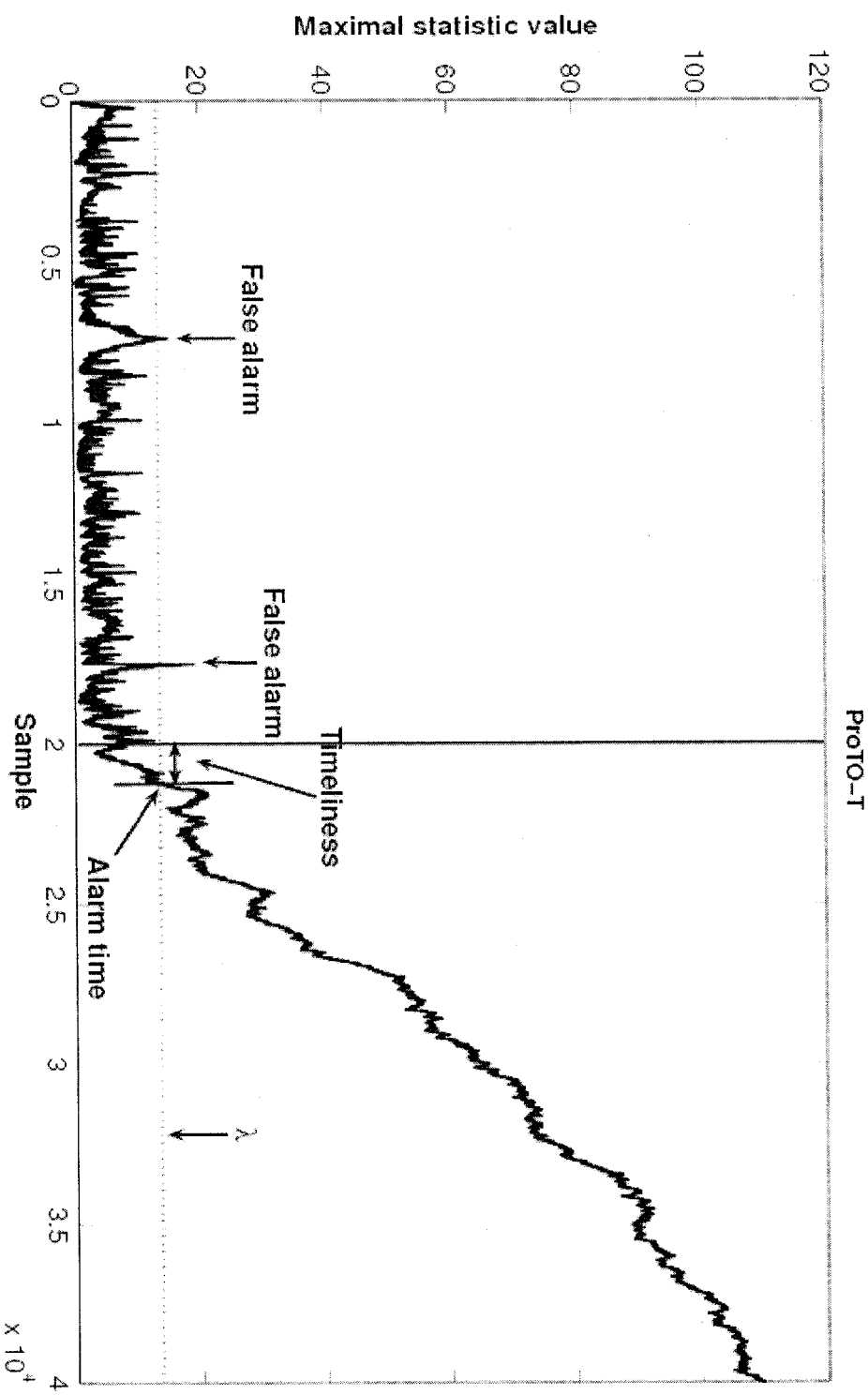
FIGS. 3*a*-3*b* are graphs of a typical experiment, FIG. 3*a* showing the result using the ProTO-T algorithm, while FIG. 3*b* showing the result using the PHT algorithm.

In a typical experiment with the ProTO-T algorithm, random data is sampled from a standard normal distribution for 20,000 samples. Then, at sample 20,000, the mean of the random source is changed by $\Delta=0:5\%$. As FIG. 3a shows, the maximal statistic value $T_{max}(n)$, which is generally lower than 15 (i.e., $\lambda$) until sample 20,000, begins climbing. After 100 samples, $T_{max}(20, 100)$ crosses the chosen alert threshold $\lambda$. As can be seen, a greater $\lambda$ would reduce the number of false alarm (two false alarm are evident: in sample 7,500 and in sample 17,000), but would also delay in detection of the change.

Figure 3B:
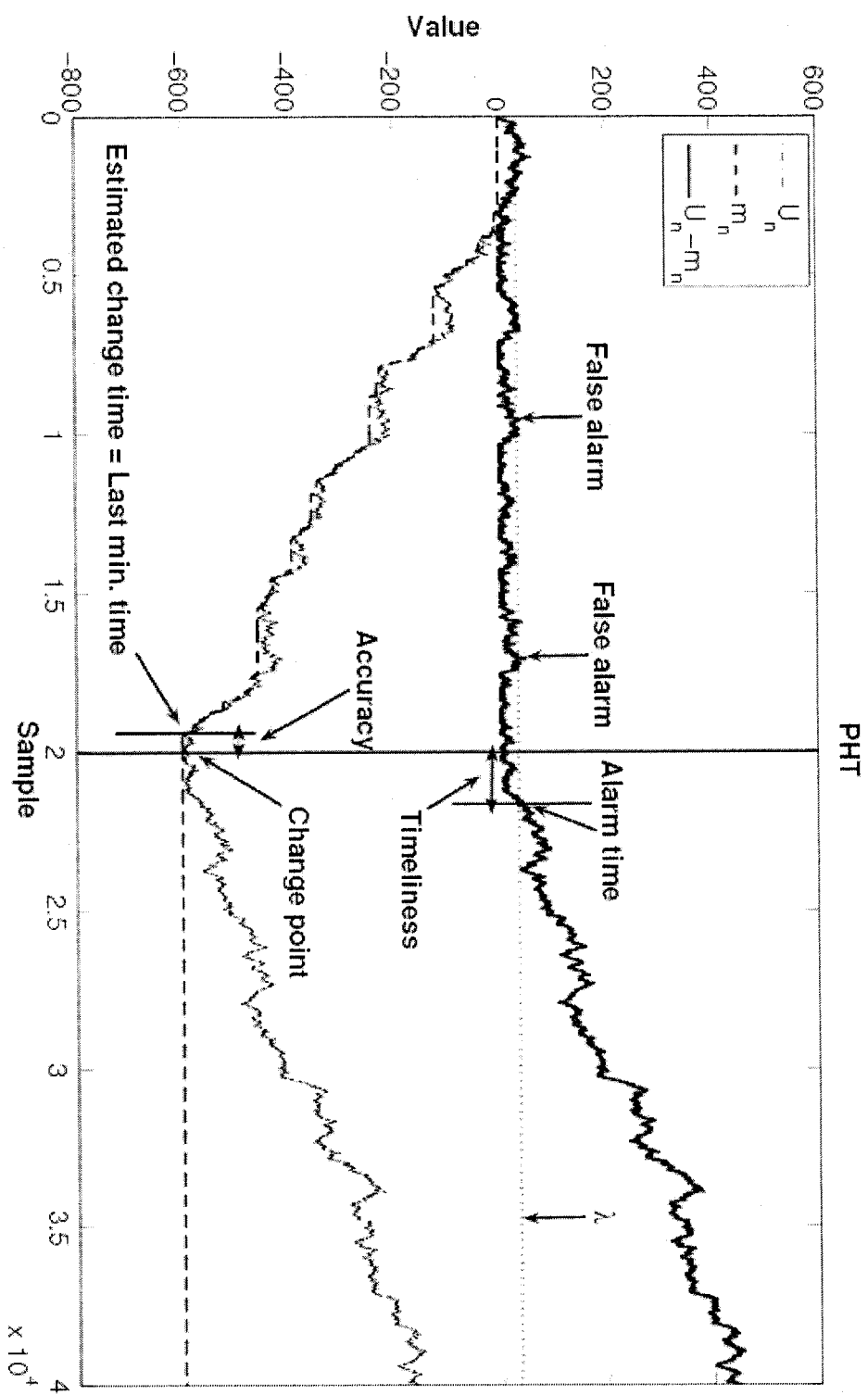

FIG. 3b describes the same typical experiment with PHT. As the figure shows, the PHT statistic value, $(U_n-m_n)$, is generally lower than 20 until sample 20,000, when it begins climbing. At sample 21,500, the PHT statistic value crosses the chosen alert threshold $\lambda$. As in the previous experiment, increasing $\lambda$ would reduce the number of false alarm (two false alarm are evident: in sample 9,500 and in sample 17,000), but would also delay detection of the change.

The accuracy of the change time estimation is also interesting. For PHT, 500 samples separate sample 19,500, in which the last minimum value $m_n$ was obtained, and the change point. In comparison, for ProTO-T the candidate with the maximal statistic value which first crosses the chosen alert threshold is the one created at sample 20,006.

Figure 4:
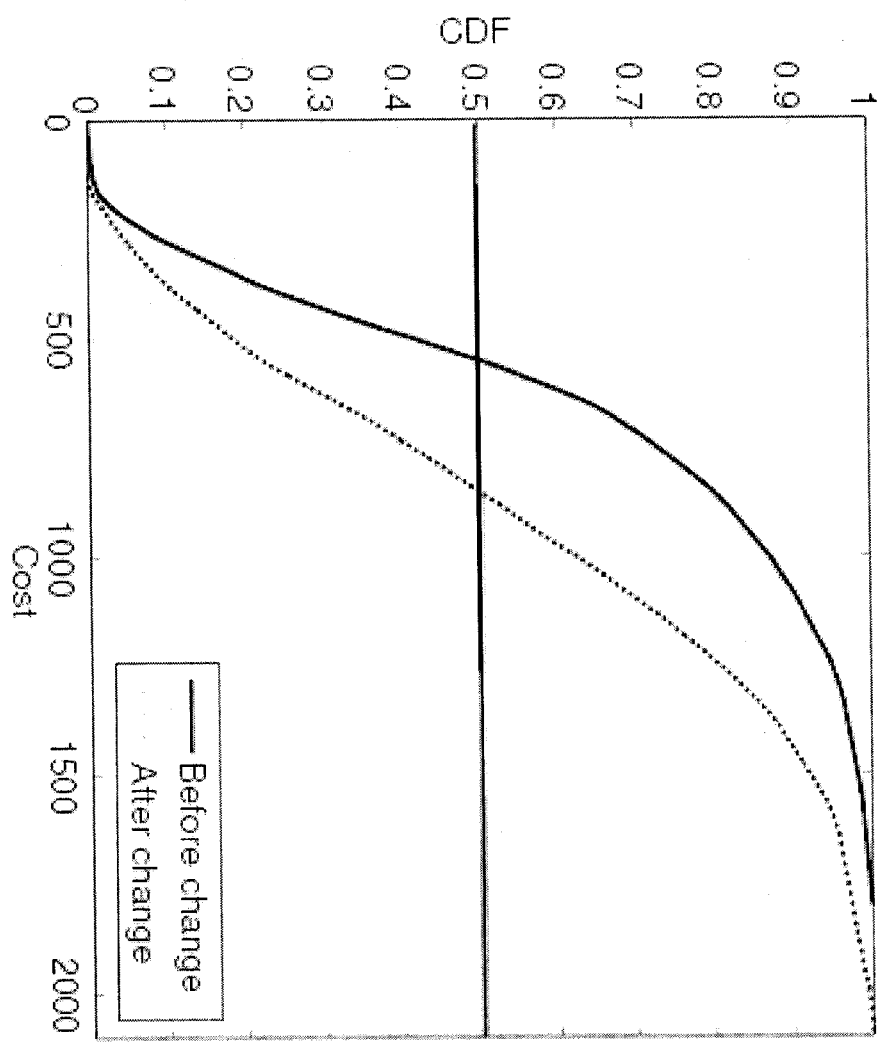
FIG. 4 presents the cumulative distribution function (CDF) of the ProTO-T cost for the typical experiment illustrated in FIGS. 3a-3b.

The cost of the ProTO-T is proportional to the number of candidate change points it maintains. Since that number has random properties, it is presented in terms of its cumulative distribution. FIG. 4 presents the cumulative distribution function (CDF) of the ProTO-T cost for this typical experiment. As we can see, the ProTO-T cost may be different before and after the change occurs. We can see that on average ProTO-T maintains a few hundred candidates: five hundreds before the change and seven after the change. Furthermore, before the change, it uses less fewer than one thousand candidates more than 90% of the time.

The performance of a change point detection is measured in terms of its timeliness (when, if ever, it detects the change), accuracy (how closely it points to the change point) and cost (in our case, the number of candidates it maintains). However, timeliness and accuracy must be presented relative to the rate of false positive. This is because they can easily be traded against a higher rate of false positives. Thus, in our performance measurement the full range of the tradeoff of accuracy vs. ARL and timeliness vs. ARL is investigated. Similarly, the cost of the algorithm can be reduced at the expense of accuracy and timeliness and thus our results present that tradeoff. In the performance graphs we also added a line indicating the performance point achieved at the reasonable average costs. We prefer this presentation to the three dimensional graphs (e.g., Accuracy vs. ARL vs. Cost) otherwise required.

Experiment with ProTO-$\chi^2$

Figure 5:
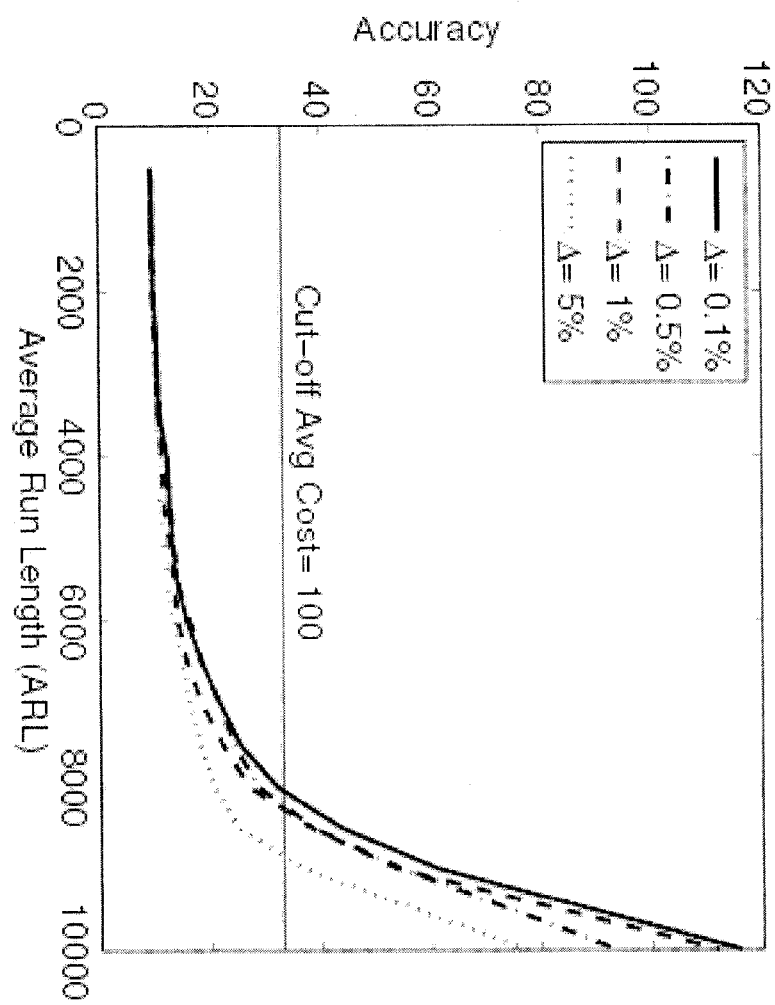
FIG. 5 shows the average accuracy of ProTO-$\chi^2$ over four different magnitudes of change ($\Delta$) in an average experiment.

In the following experiment, random data is sampled for every controlled data stream from the same binomial distribution for 200,000 samples. Then, at sample 200,000, the mean of the random source is changed by $\Delta$. We ran the ProTO-$\chi^2$ over one hundred different controlled data streams for each certain $\Delta$. FIG. 5 shows the average accuracy of ProTO-$\chi^2$ over four different magnitudes of change ($\Delta$). Typically, at all magnitudes of change and especially for the higher ARL values, ProTO-$\chi^2$ accuracy is within several dozen of samples. Furthermore, ProTO-$\chi^2$ timeliness is within several hundred samples (see FIG. 6).

Complementing this view is the cost average of the ProTO-$\chi^2$. As FIG. 7 shows, ProTO-$\chi^2$ uses less than one thousand candidates before the change.

Because the magnitude of change $\Delta$ does not affect the cost, we report here only the cost average for $\Delta=1\%$. We can see that the accuracy average deteriorates as the cost average decreases. This is because the ProTO-$\chi^2$ retains fewer candidates; thus, it is less likely that one of them would points accurately to the change point. The timeliness average also deteriorates as the cost average decreases, for the same reason.

Figure 6:
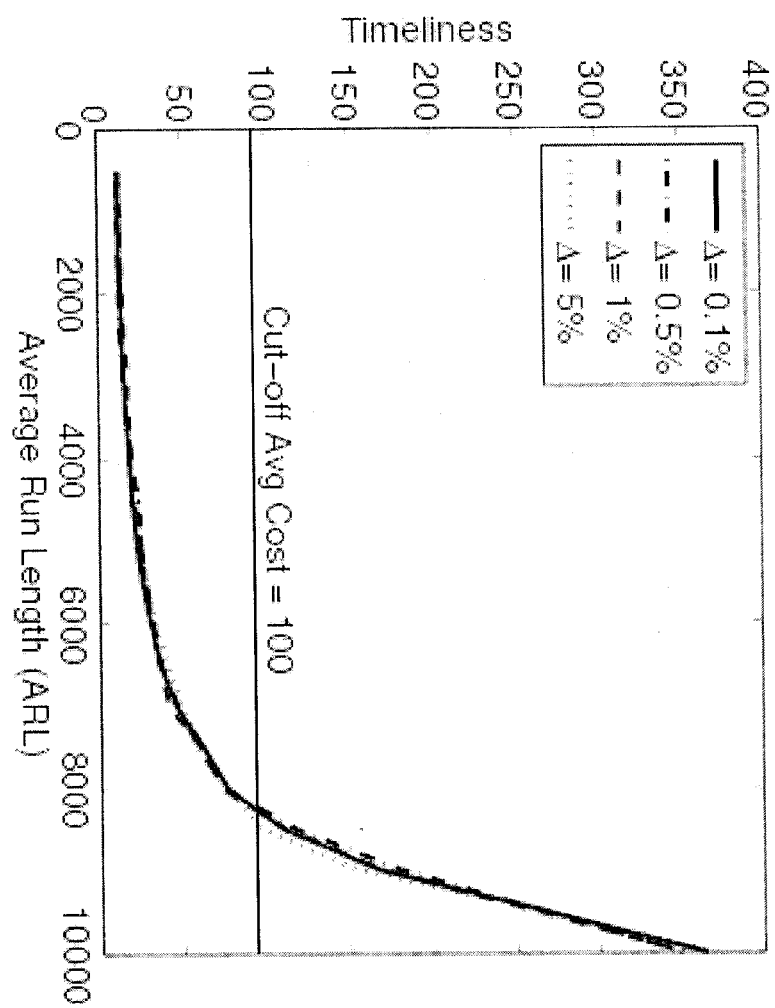
FIG. 6 is a graph showing Timeliness vs. ARL.
Figure 7A:
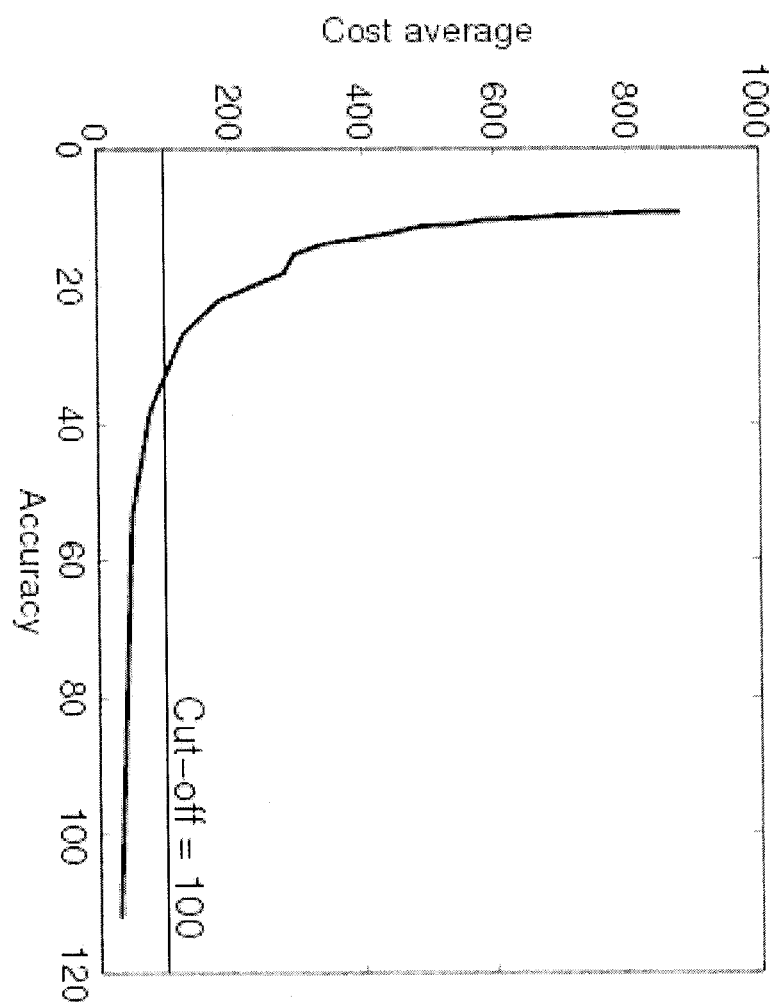
FIGS. 7a-7b are graphs showing the cost average of the ProTO-$\chi^2$ experiment of FIGS. 5, 6 illustrating cost vs. Accuracy (FIG. 7a) And Timeliness (FIG. 7b).
Figure 7B:
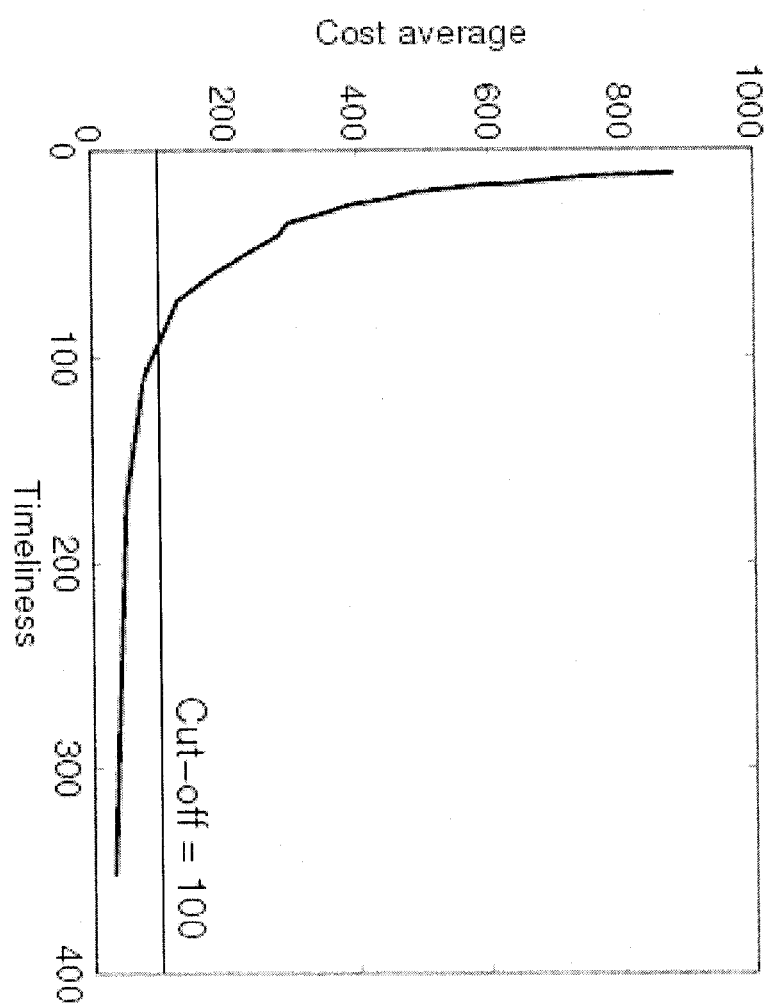

The horizontal solid line in FIGS. 5, 6, and 7 is a cut-off for average cost of 100 when $\Delta=1\%$. As can be seen, even at this reasonable cost ProTO-$\chi^2$ takes just 93 samples after the change in order for it to indicate for change. In addition, the ProTO-$\chi^2$ accuracy is within 33 samples and its ARL is 8,000.

ProTO-T and PHT

In the following experiment, we compared ProTO-T with PHT. Our results show that ProTO-T outperforms PHT in the proportion of both accuracy and timeliness to ARL. We also show that the cost of ProTO-T is asymptotic to that of PHT, which is constant per new data sample. What is notable here is that ProTO-T provided better accuracy and timeliness for an acceptable cost.

Figure 8:
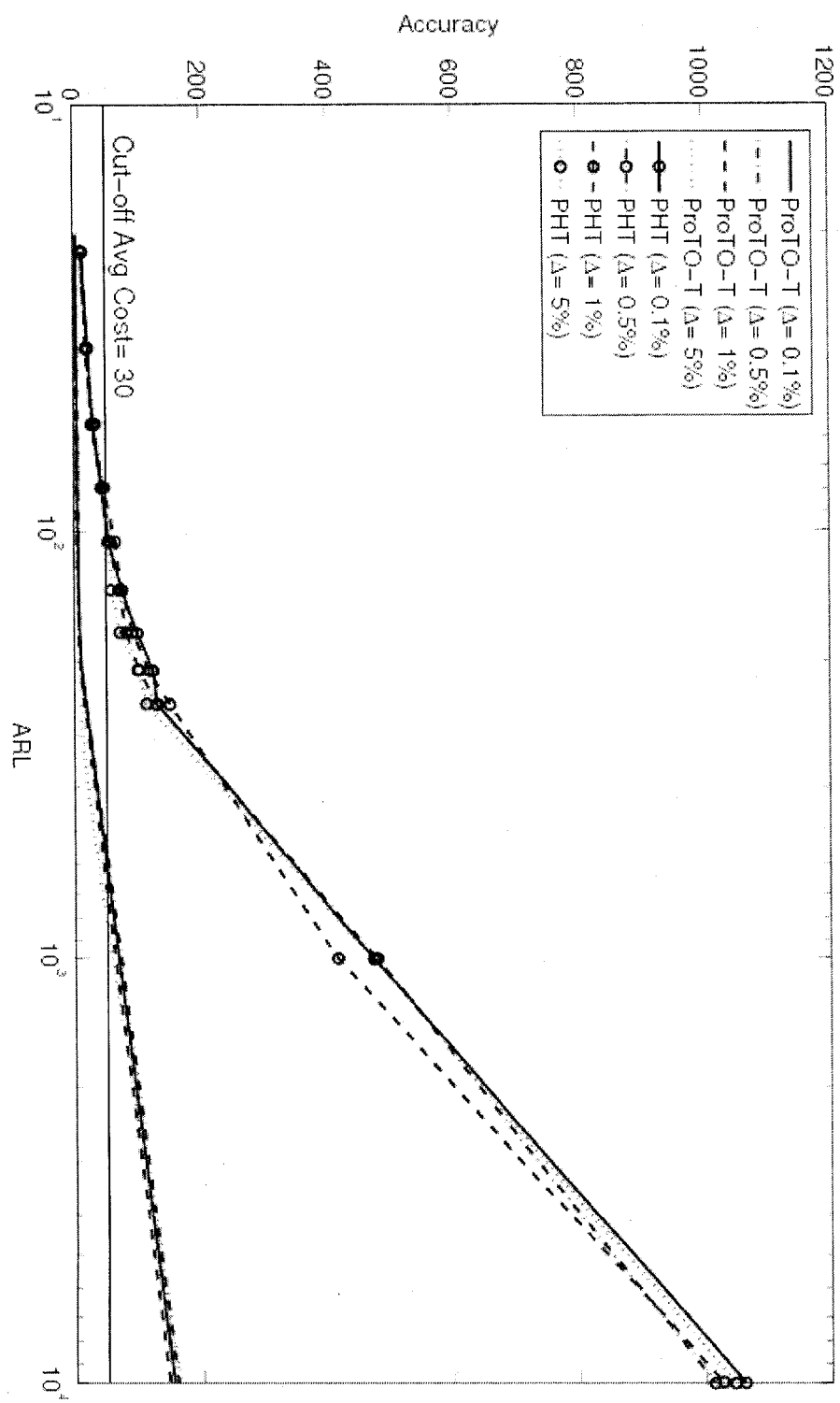
FIG. 8 depicts Accuracy vs. ARL in an experiment comparing ProTO-T with PHT.

In this experiment, random data is sampled for every controlled data stream from the same standard normal distribution, for 200,000 samples. Then, at sample 200,000, the mean of the random source is changed by $\Delta$. We ran the experiment over one hundred different controlled data streams for each $\Delta$. FIG. 8 depicts the accuracy average of ProTO-T vs. that of PHT over four different magnitudes of change $\Delta$. The minimal detectable change threshold of PHT, $\delta$, was set to $\Delta$ at each experiment. In comparison, the ProTO-T indications are far more accurate than those of PHT. At all magnitudes of change and especially for the higher ARL values, ProTO-T usually indicates for a change within accuracy of several dozens of samples whereas PHT usually indicates for a change within accuracy of several hundreds. Furthermore, ProTO-T takes several hundreds of samples less than PHT to indicate after the change occurrence (see FIG. 9).

Figure 10A:
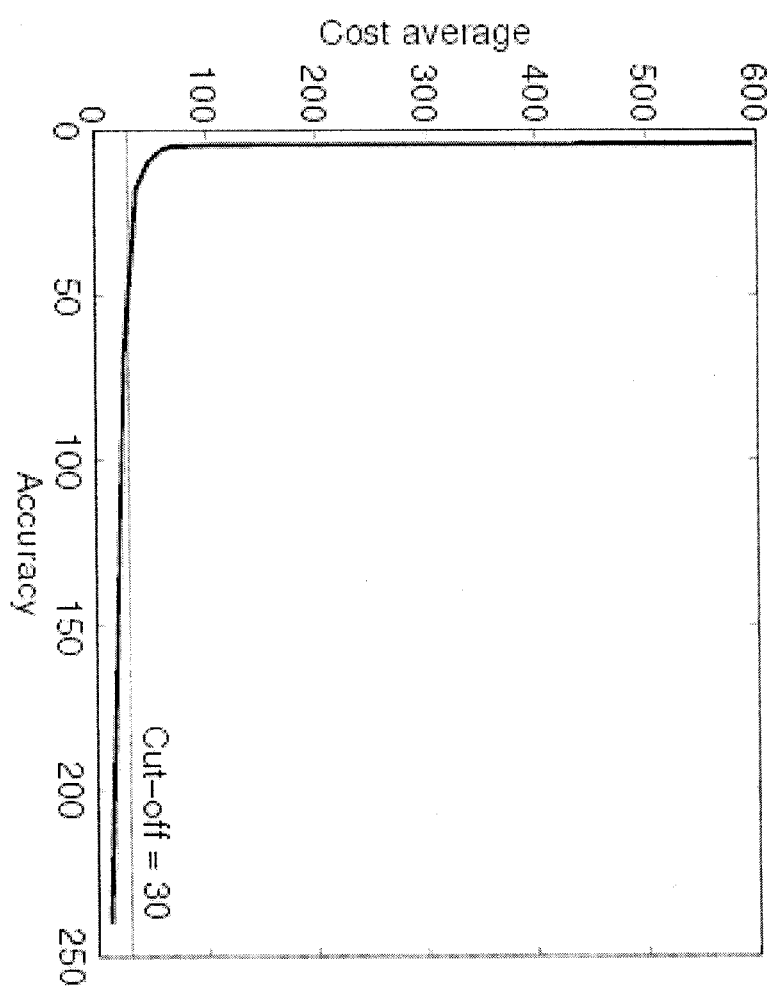
FIGS. 10a-10b are graphs of the cost average of ProTO-T, showing that ProTO-T uses less than one thousand candidates before the change.
Figure 10B:
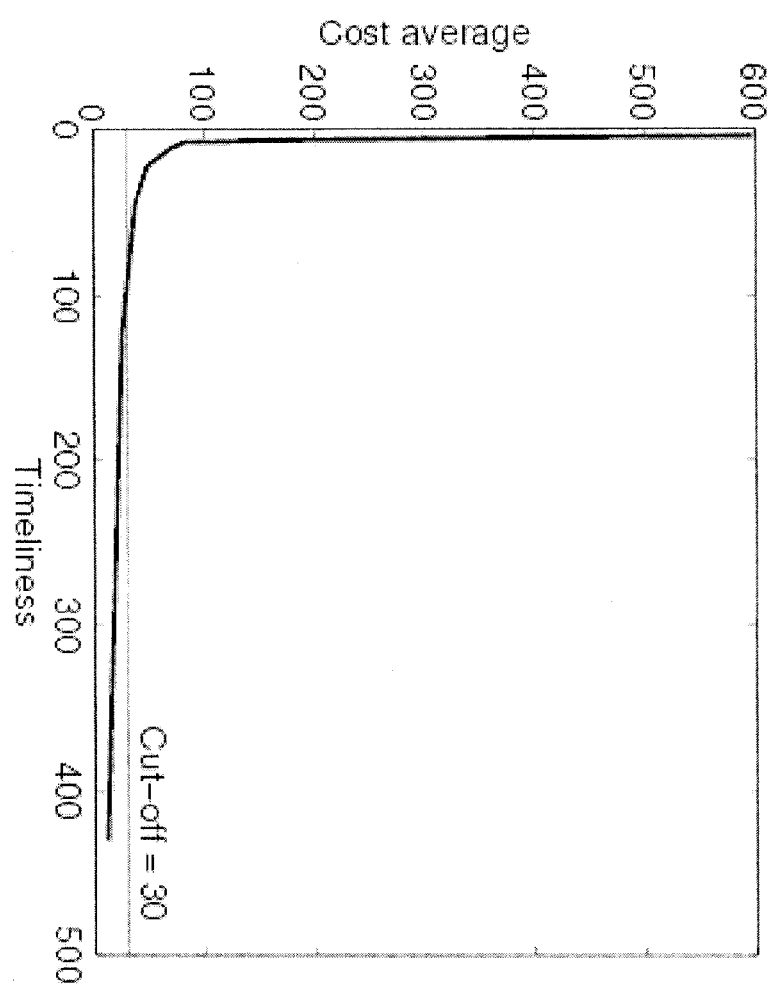

Complementing this view is the cost average of ProTO-T. As FIG. 10 shows, ProTO-T uses less than one thousand candidates before the change. Because the magnitude of change, $\Delta$, does not affect the cost, we report here only the cost average for $\Delta=1\%$. As we can see, the accuracy average deteriorates as the cost average decreases. Similarly, the timeliness average deteriorates as the cost average decreases.

Figure 9:
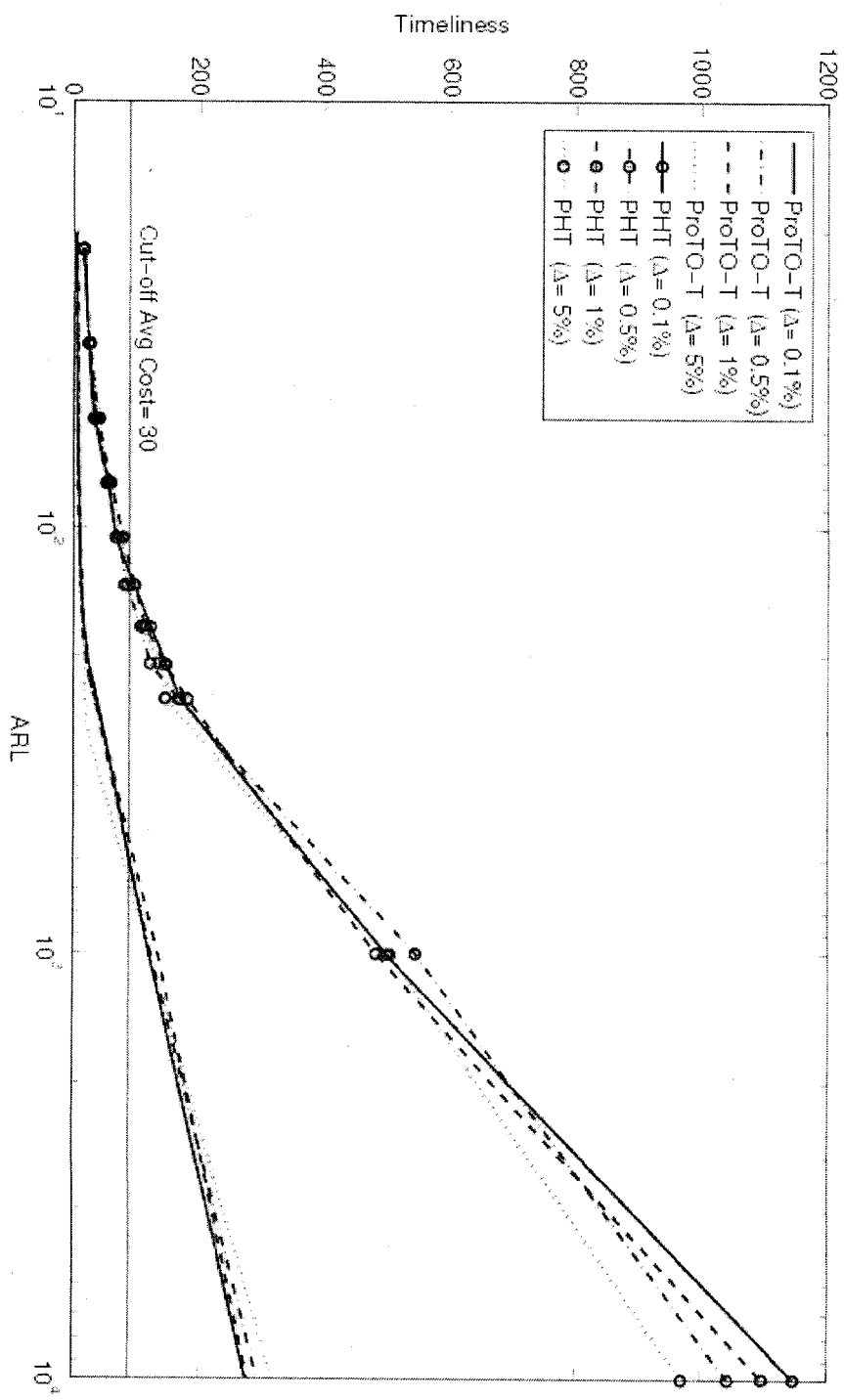
FIG. 9 depicts Timeliness vs. ARL in an experiment comparing ProTO-T with PHT, showing that ProTO-T takes several hundreds of samples less than PHT to indicate after the change occurrence.

The horizontal solid line in FIGS. 8, 9, and 10 is a cut-off for average cost of 30 when $\Delta=1\%$. We can see that ProTO-T takes about 90 samples after the change in order for it to indicate for change. In addition, the ProTO-T accuracy is within 50 samples and its ARL is about 1,000. In comparison, for the same timeliness and accuracy, the ARL of PHT is about 100.

Mean Monitoring

We compared the ProTO-Mean algorithm to PHT-Mean. Analysis of the utility of the algorithm becomes much simpler when it is given a specific application. Here, the utility metric can be taken directly from the application domain. Furthermore, cases in which the algorithm fails to detect a change altogether or falsely alarms have a simple, measurable, effect on performance. The utility metric of the mean estimation algorithm is measured by the distance of the estimated mean from the actual mean.

Figure 11:
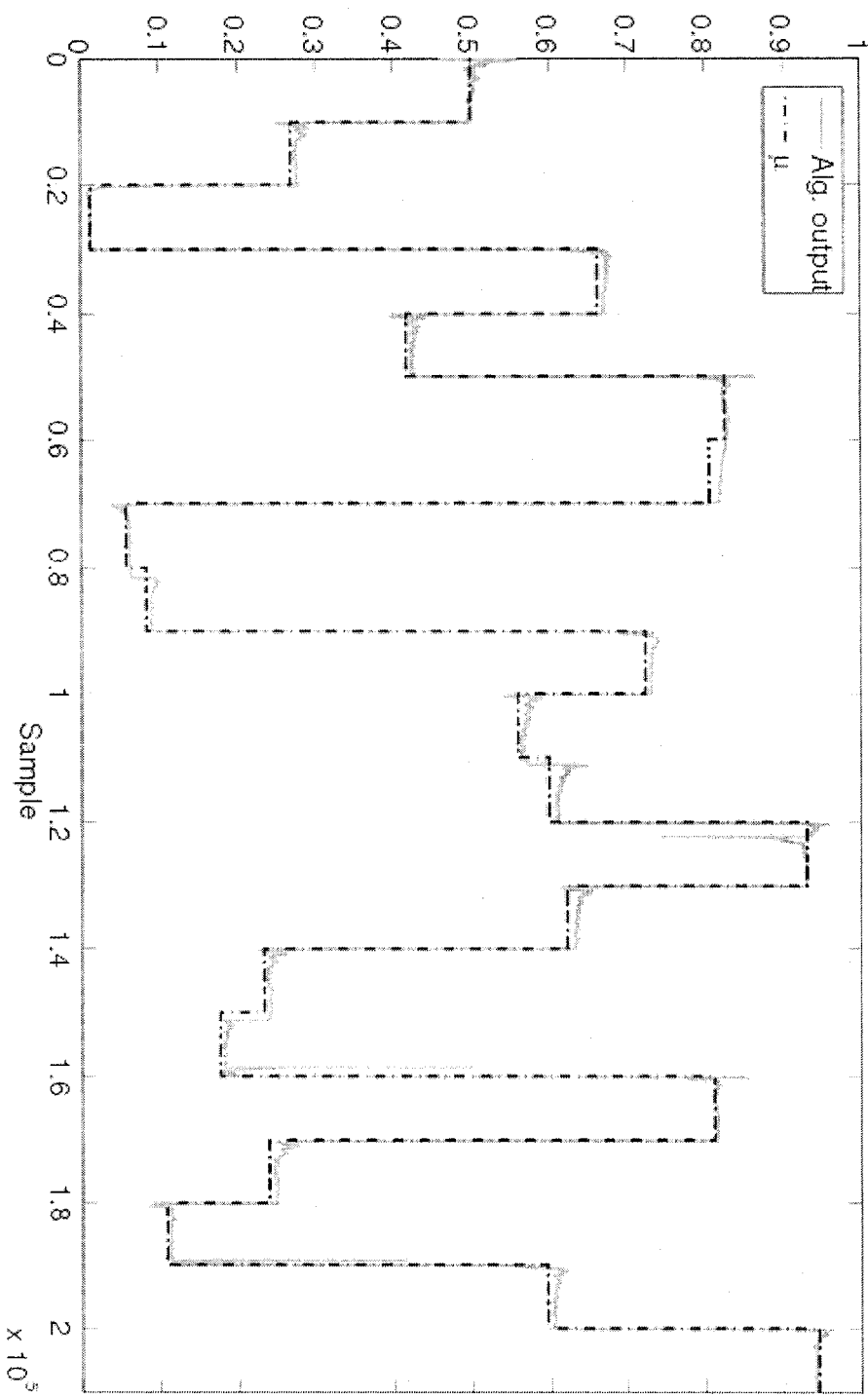
FIG. 11 depicts a typical experiment with the mean estimation algorithm.

A typical experiment with the mean estimation algorithm is presented in FIG. 11. The mean of the random source $\mu$ is drawn against the estimation of the ProTO-Mean algorithm. The mean $\mu$ changes randomly every 10,000 samples and the output of the algorithm follows it. When, as is typical, the algorithm detects the change, it flushes its statistics, which naturally results in a short period of noisy estimation (most evident for samples 50,000, 160,000, and 180,000). When the change is small, it may take longer for the algorithm to identify it (e.g., at sample 80,000) or it might fail to detect it altogether (e.g., at sample 60,000). In these cases the algorithm pays in longer periods of notable inaccuracy. Also evident in FIG. 11 are two false alarms: right after the change in sample 120,000 and just before the change in sample 160,000. In both cases, the algorithm pays in a very short period of very high inaccuracy. This is because the false alarm was caused by a short tail of atypical data, which, when the algorithm detected the change and discarded the head, momentarily became its approximation of µ.

Figure 12:
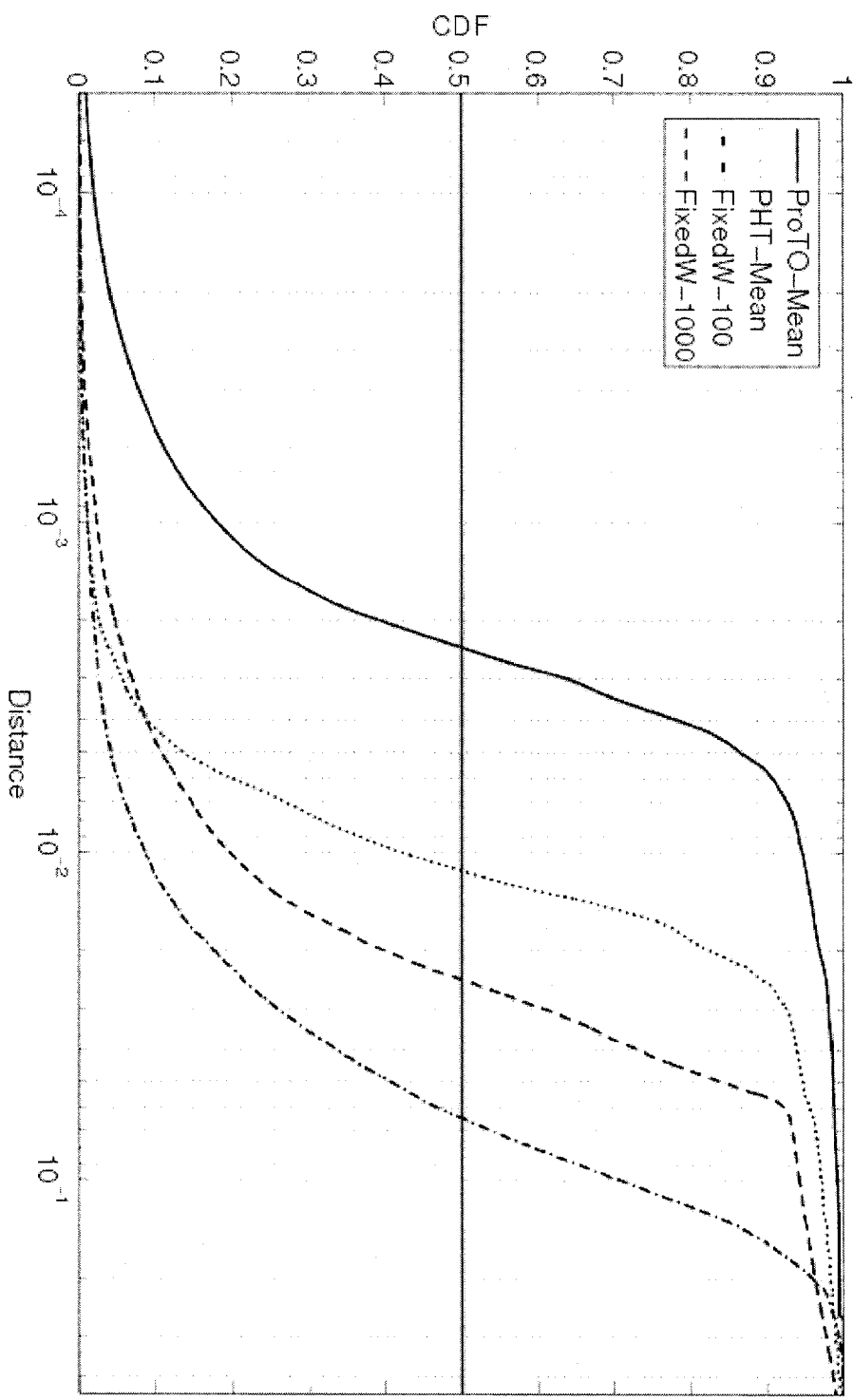
FIG. 12 is a graph showing the utility of the Mean Estimation Algorithms for changes every 10,000 samples on the mean $\mu$.

FIG. 12 provides a more meaningful view of the experiment. As we can see, the ProTO-Mean algorithm's approximation is within 2% of the actual mean 90% of the time. Note that this number includes an error, which stems from the limited size of the sample right after the change is detected. In contrast, the PHT-Mean algorithm's approximation is within 10% of the actual mean 90% of the time. On the whole, ProTO-Mean is far more accurate than PHT-Mean.

ProTO-Mean and PHT-Mean can be further compared with a trivial algorithm for mean estimation which it maintains a sliding window with fixed size. On every new sample it recalculates the average from the last samples seen in that window. FIG. 12 also shows the accuracy of this algorithm with two different window sizes of 100 and 1,000. As we can see, the fixed window algorithm's approximation is within 20% of the actual mean 90% of the time.

Figure 13:
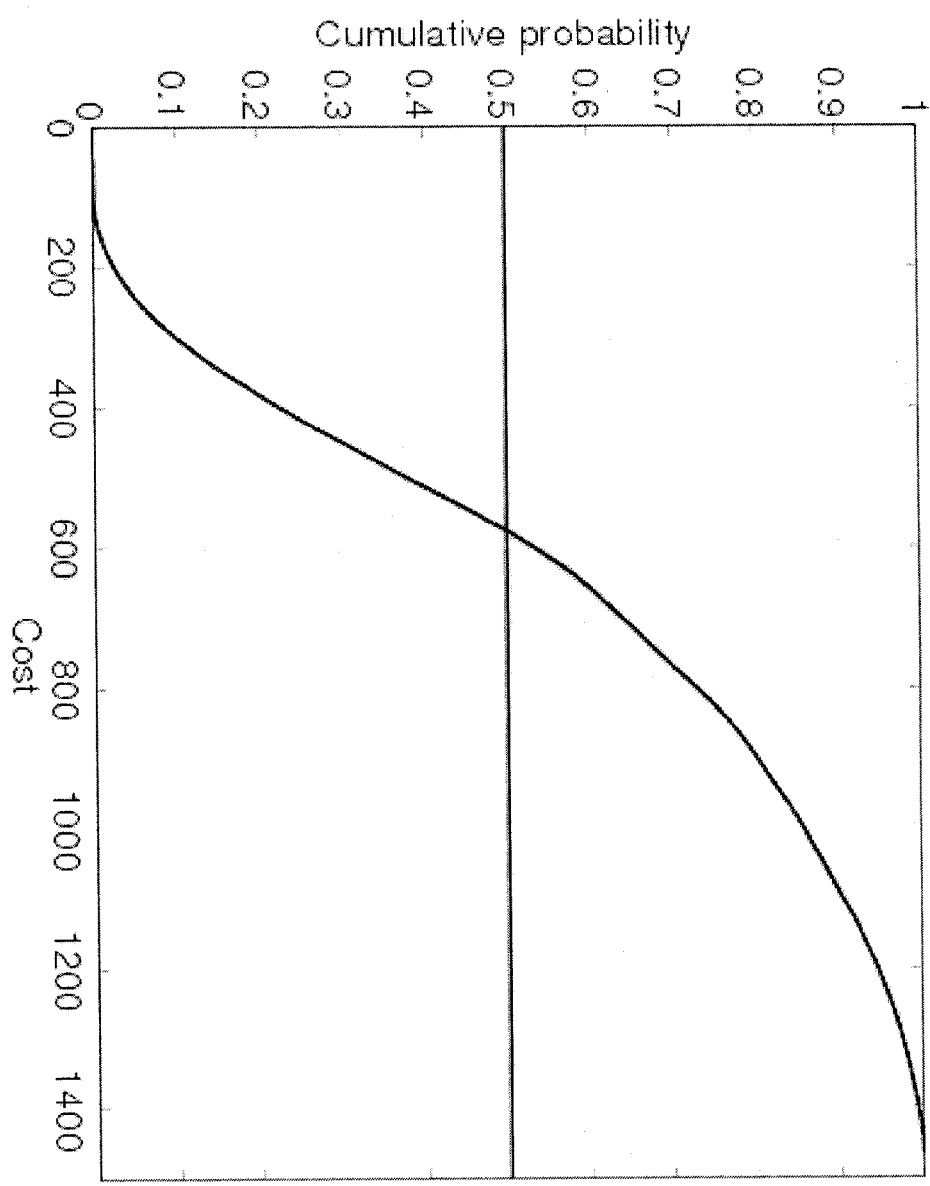
FIG. 13 is a graph of the cost of the ProTO-Mean Algorithm, showing that ProTO-Mean uses less than 1,200 candidates more than 90% of the time.

Complementing this view is the cost distribution of the ProTO-Mean algorithm. As FIG. 13 shows, ProTO-Mean uses less than 1,200 candidates more than 90% of the time.

Appendix: General Applicability of the ProTO Algorithm

The ProTO algorithmic framework might be applicable to many statistical two-sample tests.

We have shown, by way of example, how to apply the framework to the $\chi^2$ two-sample test and to the Student's two-sample t-test. However, many two-sample tests determine whether there is a difference between the two samples based on the same idea: the convergence of the test statistic value is very different for two samples from the same unknown distribution than for two samples from different, unknown distributions. A person skilled in the art will immediately perceive how to apply the algorithms of the invention to other two-sample tests. Several examples follow:

The parametric two-sample Z-test compares the means of the two samples to determine whether there is a difference between the two samples. If the two samples are derived from the same normal distribution, then the test statistic value has a known distribution—the normal distribution. If, however, the two samples come from different distributions, then the test statistic value tends to a constant as one of the samples grows. The Z-test statistic is $$Z = \frac{\overline{X}_1 - \overline{X}_2}{\sqrt{\frac{\sigma_1^2}{n_1} + \frac{\sigma_2^2}{n_2}}}$$

where $\overline{X}_1$ and $\overline{X}_2$ are the sample means, $\sigma_1$ and $\sigma_2$ are the standard deviation, and $n_1$ and $n_2$ are the sizes of the first sample while the second sample respectively. If one sample has a fixed size and the other grows, this test statistic eventually tends to a constant $$\lim_{t \to \infty} Z(t) = (\overline{X}_1 - \overline{X}_2) \frac{\sqrt{n_1}}{\sigma_1}.$$

Figure 14:
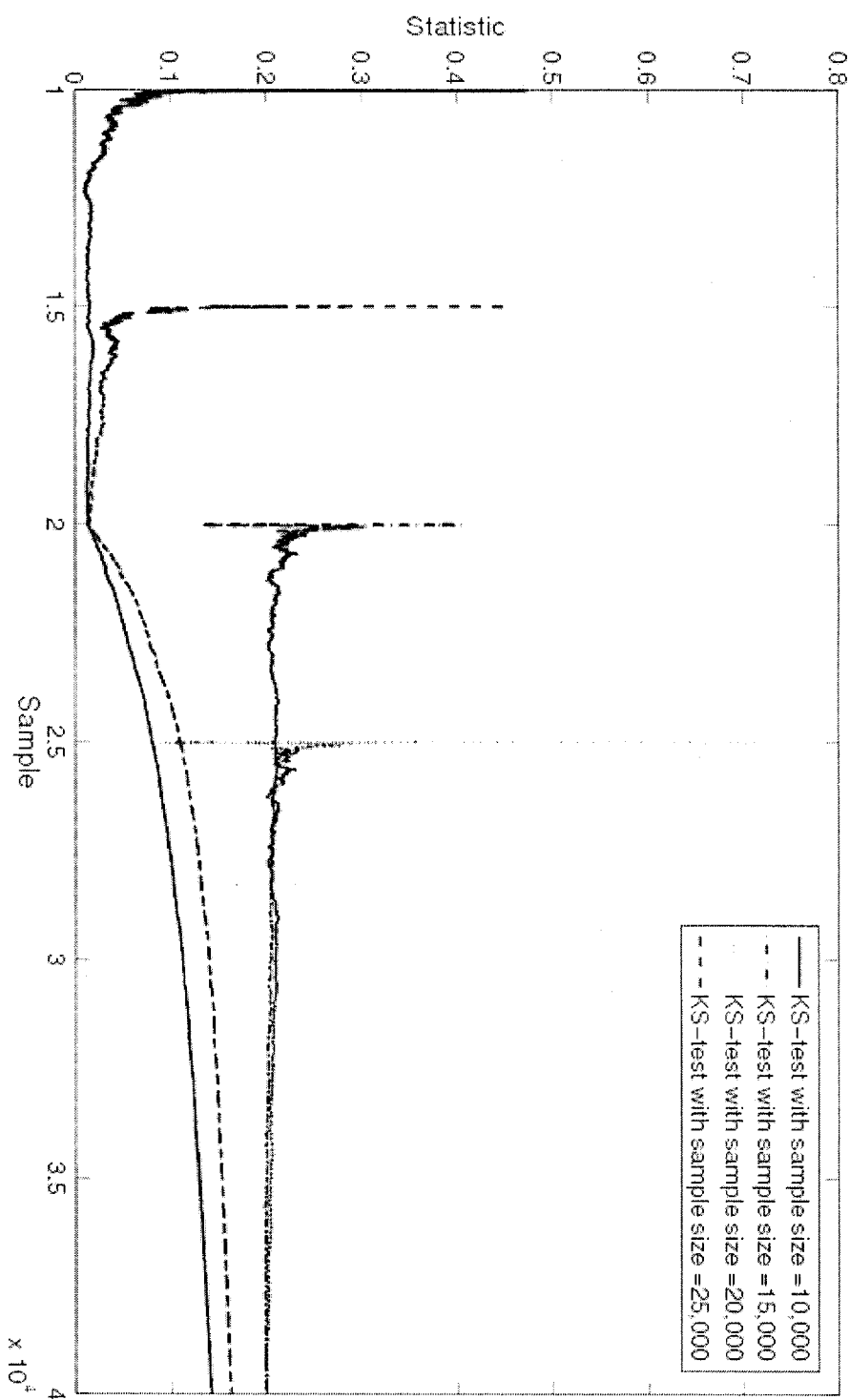
FIG. 14 is a graph of the Kolmogorov-Smirnov (KS) test statistic value when the mean of the random source is changed at sample $x_{20,000}$.
Figure 15:
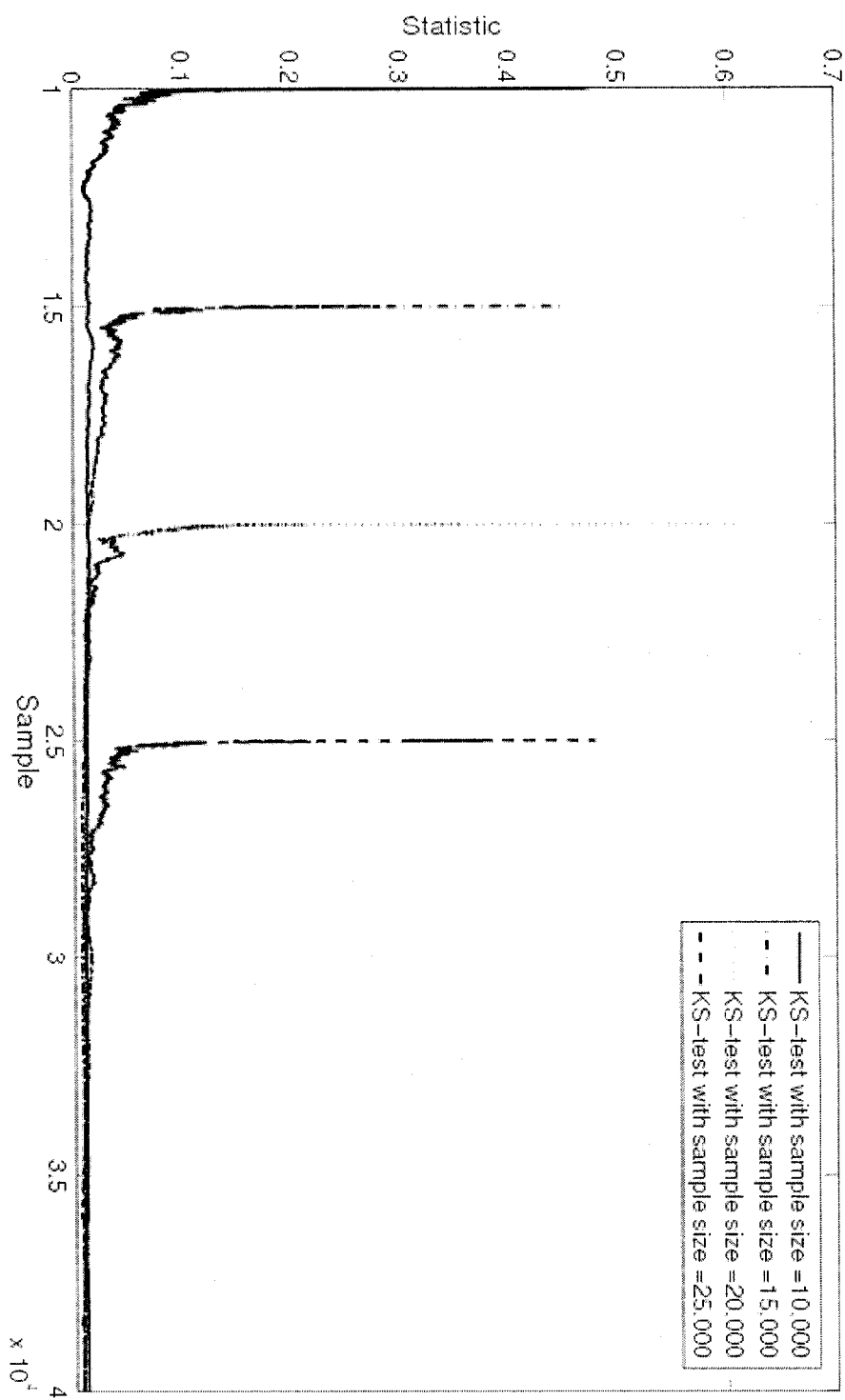
FIG. 15 is a graph showing, for four different heads and tails, the same KS-test statistic (of FIG. 14) when no change occurs.

The two-sample Kolmogorov-Smirnov test (KS-test) is used to test whether two samples come from the same distribution. The two-sample KS-test uses the maximal distance between cumulative frequency distributions of the two samples as the test statistic. The KS-test statistic is $$D_{n,n'} = \sup_x | F_{1,n} - F_{2,n'} |$$

where $F_{1,n}$ and $F_{2,n'}$ are the empirical distribution functions of the first and the second sample respectively. If the two samples are derived from the same unknown distribution, then the test statistic value has a known specific distribution—the Kolmogorov distribution. Otherwise, it tends to a constant as one of the samples grows. FIG. 14 and FIG. 15 present the results of a simulation of the case where one of the samples has a fixed size and the other sample size is increased.

FIG. 14 presents the KS-test statistic value when the mean of the random source is changed at sample $x_{20,000}$ whereas FIG. 15 presents, for four different heads and tails, the same KS-test statistic when no change occurs. Obviously, the KS-test statistic value tends to zero when no change occurs on the mean of the random source while in the other case it does not. Such difference in behavior can possibly be used by a ProTO-like algorithm.

Figure 16:
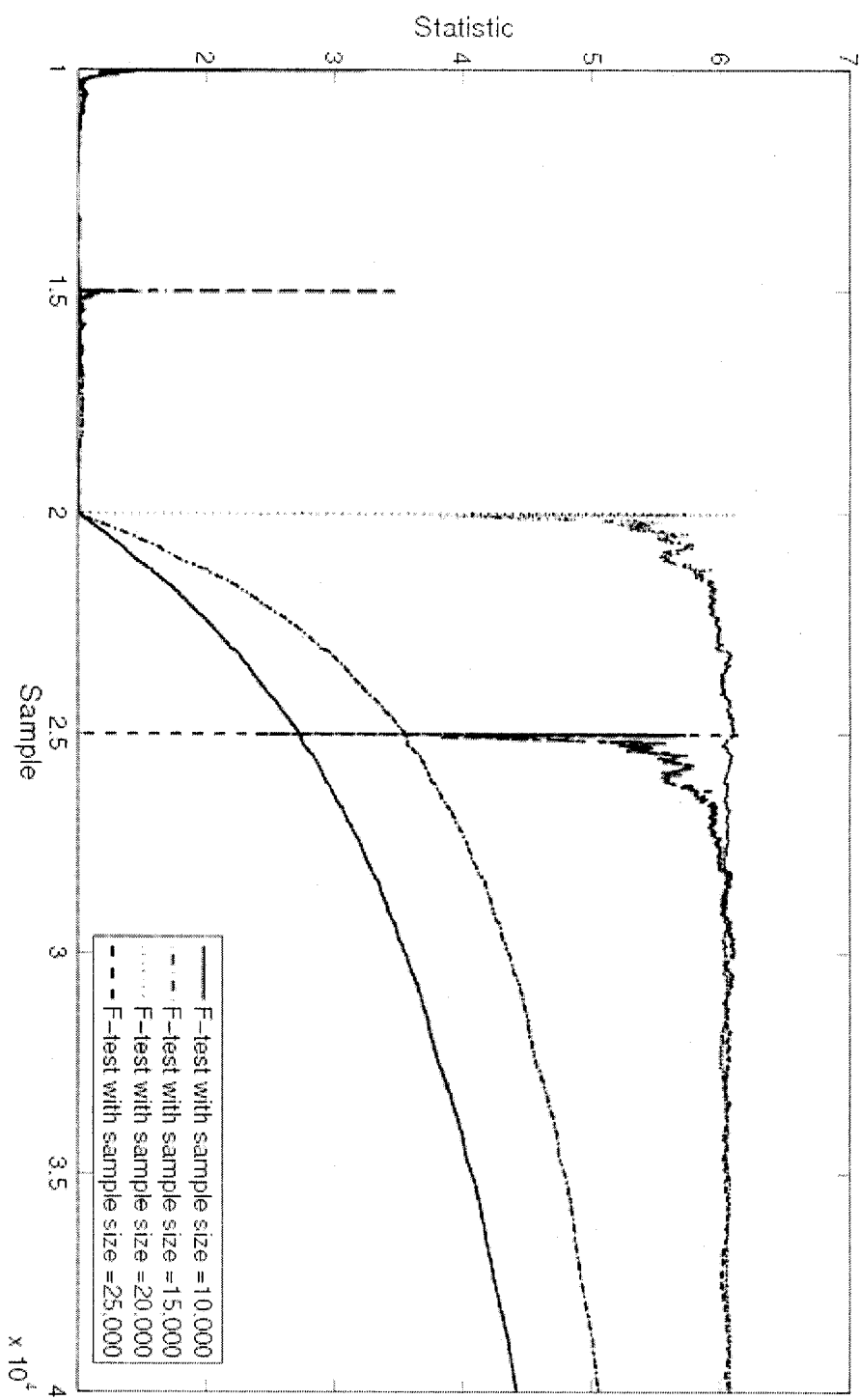
FIG. 16 is a graph showing the F-test statistic behavior when the variance of the random source is changed at sample 20,000.
Figure 17:
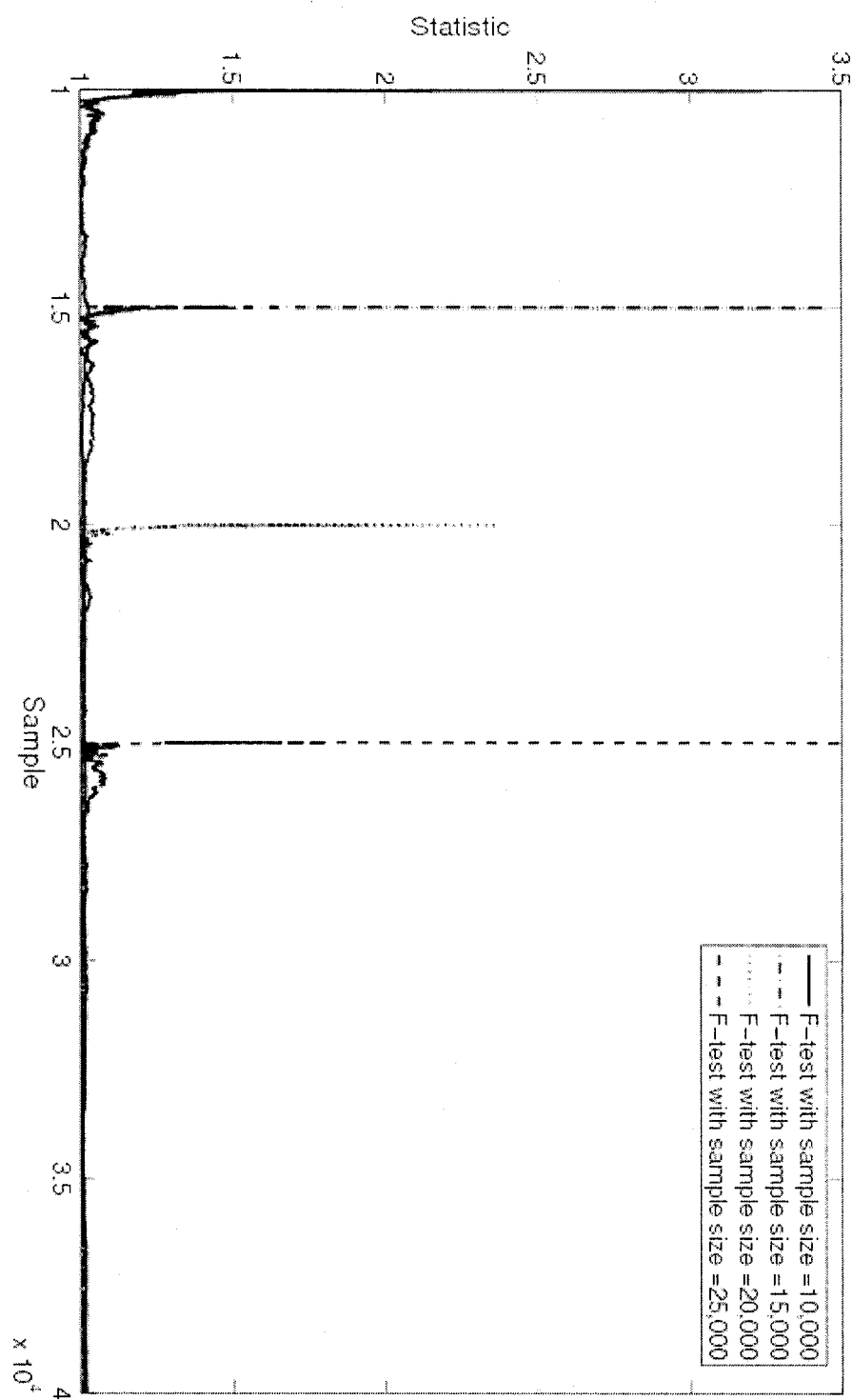
FIG. 17 is a graph showing the F-test statistic behavior when no change occurs on the variance of the random source.

The two-sample F-test is designed to test whether the two samples have the same variance. It does this by considering a decomposition of the variability in terms of sums of squares. The F-test statistic is defined as the ratio of two scaled sums of squares reflecting different sources of variability and is computed as F=

$$\frac{S_1^2}{S_2^2}$$

where $S_1^2$ is the larger sample variance and $S_2^2$ is the smaller sample variance. If the two samples have the same variance, then the test statistic value has a known specific distribution—the F-distribution. Otherwise, it tends to a constant as one of the samples grows. FIG. 16 and FIG. 17 present the results of a simulation of the case where one of the samples has a fixed size and the other sample size is increased. FIG. 16 presents the F-test statistic value when the variance of the random source is changed at sample $x_{20,000}$ whereas FIG. 17 presents, for four different heads and tails, the F-test statistic when no change occurs. Again the F-test statistic value tends to one when no change occurs on the variance of the random source while in other case it does not. As we proposed for the KS-test, this difference in behavior may very well be used by a ProTO-like algorithm.

Resource Optimization

Our approach to the problem of delayed detection is to dynamically manage both the number of windows and their sizes. We decide to stop collecting statistics for some time-windows based on the estimated probability that they will be the first to alert on a change. In this way the computational cost of our approach is variate. Approaches e.g., Kifer et al. and PHT have a constant computational cost which might be preferred over a variate cost. By choosing to ignore a large number of time-windows we manage to limit the computational cost to a constant, which is equivalent to PHT.

In further research two improvements to the basic ProTO algorithms will be tested. One is to purge the time-window whose upper bound statistic is the lowest whenever the number of the current time-windows exceeds a user predefined constant (see early results below). The other is to induce confidence bounds on the difference between the test statistics of two time-windows instead of bounding a single test statistics of one time-window. Such an improvement makes the bounds tighter and therefore the cost is reduced (see early results below).

Early Results in Change Point Detection in Multidimensional Streams

The statistical two-sample test called Hotelling's $T^2$ designates for detecting changes in the mean of multidimensional data streams.

Two-Sample Hotelling's $T^2$ Test

Consider that the observations in the prefix follow a multivariate normal distribution $Z \sim N_p(\mu, \Sigma)$ where $\mu$ is the mean vector and $\Sigma$ is the covariance matrix. Let $\overline{X}$ and $S$ be the sample mean vector and the unbiased sample covariance matrix respectively. Accordingly, $\overline{X}$ and $S$ are computed based on the sample data as follows:

$$\overline{X} = \frac{1}{n}\sum_{k=1}^{n} x_k \text{ and } S = \frac{1}{n-1}\sum_{k=1}^{n}(x_k - \overline{x})(x_k - \overline{x})'.$$

The two-sample Hotelling's $T^2$ is the multivariate analog of the two-sample t-test in uni-variate statistics. It is used in order to compare two populations which determined if the mean vector has changed between two samples. Let $n_1$, $\overline{X}_1$ and $S_1$ be the number of observations, the sample mean vector, and the unbiased sample covariance matrix of one sample, and let $n_2$, $\overline{X}_2$ and $S_2$ be the same aggregates for the other sample, respectively. Hotelling's $T^2$ test statistic is defined as:

$$T^2 = (\overline{x_1} - \overline{x_2})'\left(\frac{S_1}{n_1} + \frac{S_2}{n_2}\right)^{-1}(\overline{x_1} - \overline{x_2}). \tag{19}$$

The predominant characteristic of Hotelling's $T^2$ test is that if both samples are derived from the same multivariate normal distribution $Z \sim N_p(\mu, \Sigma)$ with unknown $\mu$ and $\Sigma$, then the test statistic is $\chi^2$ distributed with p degrees of freedom. If, on the other hand, the two samples come from distributions in which the mean vector is different, then the value computed by the test statistic will no longer distributed as $\chi^2$ and its value will be significantly larger. The test holds for large sample size such that $n_1 + n_2 - p > 40$.

When the test is applied to the head and the tail of a prefix of a stream, $T^2(n)$ can be written as:

$$T_i^2(n) = (\overline{x_1} - \overline{x_2})'\left(\frac{S_1}{i} + \frac{S_2}{n-i}\right)^{-1}(\overline{x_1} - \overline{x_2}). \tag{20}$$

As new observation arrive, $x_n$, the aggregates i, $\overline{X}_1$, and $S_1$ require no update while the aggregates n, $\overline{X}_2$ and $S_2$ can be updated incrementally by using the aggregates $\tau_n$ and $\omega_n$ as following: The sample mean vector is computed as $\overline{X}=$ $$\frac{1}{n-i}\sum_{k=i}^{n} x_k = \frac{1}{n-i}\tau_n.$$

where $\tau_n = \tau_{n-1} + x_n$. The unbiased sample covariance matrix is computed as $$S_2 = \frac{1}{n-i-1}\sum_{k=i}^{n}(x_k - \overline{x}_2)(x_k - \overline{x}_2)'$$

$$= \frac{1}{n-i-1}\left[\sum_{k=i}^{n}(x_k x_k') - (n-i)\overline{x}_2(\overline{x}_2)'\right]$$

$$= \frac{1}{n-i-1}[\omega_n - (n-i)\overline{x}_2(\overline{x}_2)']$$

where $\omega_n = \omega_{n-1} + x_n x_n'$.

Simultaneous Confidence Intervals for the Mean

Simultaneous confidence intervals are a group of intervals where each interval contains an individual component of mean vector with a $100(1-\alpha)\%$ confidence. It is assumed that there is a multivariate normal population $Z \sim N_p(\mu, \Sigma)$. A random sample of n multivariate observations is collected, where $n-p>40$. Based on the sample data, $\overline{X}$ and $S$ are computed. Then the simultaneous confidence intervals for the mean vector $\mu$ can be characterized by the following:

$$\mu_k \in \overline{x}_k \pm \chi^2_{\alpha,p}\sqrt{\frac{S_{kk}}{n}} \tag{21}$$

$$k = 1, \dots, p$$

where $S_{kk}$ are the (k, k) elements of the sample covariance matrix. Here, $\chi^2_{\alpha,\rho}$ denotes the $\alpha$ percentile of the $\chi^2$ distribution.

Algorithmic Improvements

Maintaining a User Predefined Constant Number of Time-Windows

We choose, without loss of generality, to apply the algorithmic improvement within the ProTO-T framework. The improvement considers maintaining a user predefined constant number of time-windows. Similar to ProTO-T, ProTO-FC (see Alg. 6), maintains a set of time-windows C. Every time-window $i \in C$ has two pairs of aggregates: $sumS_i$ and $sumS_i^2$ for the head, and $sumR_i$ and $sumR_i^2$ for the tail. At the arrival of new sample $x_n$, all the aggregates in the tail of time-window i are updated as follows: $sumR_i \leftarrow sumR_i + x_n$ and $sumR_i^2 \leftarrow sumR_i^2 + (x_n)^2$. It also recalculates for every time-window i, $T_i(n)$ according to the following Eq.

$$T_i(n) = \frac{\hat{X}_S - \hat{X}_R}{\sqrt{\frac{v_S}{i} + \frac{v_R}{n-i}}}, \tag{22}$$

and recalculates $T_i^u$ according to the following Eq.

$$\lim_{n\to\infty} T_i(n) \leq T_i^u = \max\left\{\left|\left(\hat{X}_S - \hat{X}_n \pm t^*_{1-\alpha/2}\frac{sd_n}{\sqrt{n}}\right)\sqrt{\frac{i}{v_S}}\right|\right\}, \tag{23}$$

with $\hat{X}_n \doteq \hat{X}_R$ and $sd_n \doteq \sqrt{v_R}$.

At every new sample $x_n$, ProTO-FC also creates a new time-window and adds it to the set C. The tail aggregates of the new time-window are empty and its head aggregates are the sums of the respective head and tail aggregates of the first time-window in C, which are computed as follows: $sumS_i \leftarrow sumS_{first} + sumR_{first}$ and $sumS_i^2 \leftarrow sumS_{first}^2 + sumR_{first}^2$. Then, the algorithm locates the time-window max with the maximal $|T_{max}(n)|$ value. It also locates $\gamma$, whose $T_\gamma^u$ is the minimal.

Unlike ProTO-T, ProTO-FC purges the time-window whose upper bound statistic is the lowest, $T_\gamma^u$, whenever the number of the current time-windows, $|C|$, exceeds a user provided constant, $\eta$. Finally, ProTO-FC indicates a change at max if $|T_{max}(n)|$ surpasses $\lambda$.

---

Algorithm 6 The ProTO-FC Algorithm

---

Input:
  Alert threshold $\lambda$
  Confidence $\alpha$
  Number of time-windows to be maintained $\eta$
  Input stream $\{x_0, x_1, \ldots\}$
Data structure:
  A time-windows set C where every $i \in C$ has two pair of aggregates:
  $sumS_i$ and $sumS_i^2$ for the head, $sumR_i$ and $sumR_i^2$ for the tail.
  Initially C contains a dummy time-window $-1$ with $sumS_{-1}$, $sumS_{-1}^2$, $sumR_{-1}$, and $sumR_{-1}^2$ all set to zero.
Definitions:
  For every $i \in C$, $T_i(n)$ calculated according to Eq. 22, $T_i^u$ are calculated according to Eq. 23, with $\hat{X}_n \doteq \bar{X}_R$ and $sd_n := \sqrt{v_R}$ $$max \doteq \arg\max_{i \in C} \{T_i(n)\}$$

$$\gamma \doteq \arg\min_{i \in C} \{T_i^u\}$$

first $\doteq \min \{i \in C\}$
At the arrival of sample $x_n$:
1) Let $sumS_i \leftarrow sumS_{first} + sumR_{first}$, and $sumS_i^2 \leftarrow sumS_{first}^2 + sumR_{first}^2$
2) Let $C \leftarrow C \cup \{n\}$
3) Let max $\leftarrow$ first and $\gamma \leftarrow$ first
4) For every $i \in C$
  a) $sumR_i \leftarrow sumR_i + x_n$ and $sumR_i^2 \leftarrow sumR_i^2 + (x_n)^2$
  b) Recalculate $T_i(n)$ and $T_i^u$
  c) If $|T_i(n)| > |T_{max}(n)|$ then max $\leftarrow i$
  d) If $TT_i^u < T_\gamma^u$ then $\gamma \leftarrow i$
5) If $|T_{max}(n)| > \lambda$ then indicate a possible change at sample max
6) If $|C| > \eta$ then $C \leftarrow C \setminus \{\gamma\}$

---

Inducing Confidence Bounds on the Difference Between the Test Statistics of Two Time-Windows

Figure 18:
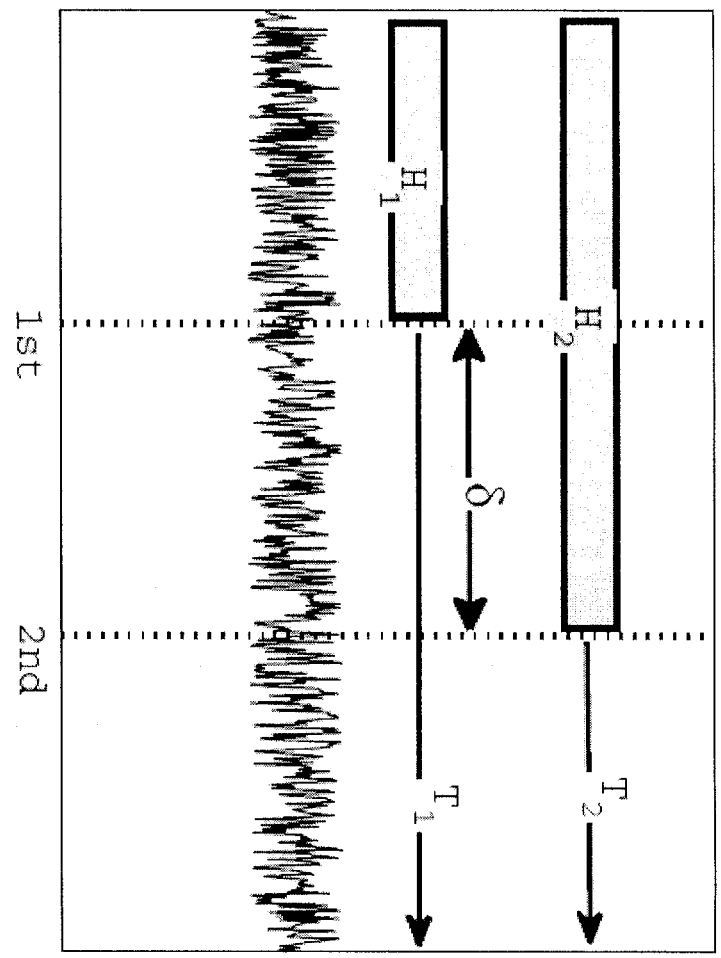
FIG. 18 is a graph showing the problem definition of inducing confidence bounds on the difference between the test statistics of two time-windows.

Consider two different points in the stream 1st and 2nd where 2nd>1st without loss of generality. We look at the long-term behavior of $\mathcal{T}_{2nd-1st}^2(n)$ as n grows toward infinity and also how to induce an upper and lower bound for the value to which $\mathcal{T}_{2nd-1st}^2(n)$ will converge. Let $h_1$ and $\bar{H}_1$ be the number of observations and the sample mean vector of the head of 1st. Let also $t_1$ and $\bar{T}_1$ be the number of observations and the sample mean vector of its tail. Let $h_2$, $\bar{H}_2$, $t_2$, and $\bar{T}_2$ be the same aggregates for 2nd, respectively (see FIG. 18).

Furthermore, let L be the distance (i.e. the number of observations) between these two points. Therefore, the average of those L observations, $\bar{\delta}$, can be computed as $$\bar{\delta} = \frac{1}{L} \sum_{i=1}^{L} x_i.$$

Let also, $\square$ be the difference between the sample mean vector of the head of 1st and the sample mean vector of the tail of 2nd (i.e., $\square = \bar{H}_1 - \bar{T}_2$). Furthermore, let $\phi$ be the difference between the weighted average $$\left(\text{i.e, } \varphi = \frac{h_1}{h_2}\bar{H}_1 + \frac{L}{h_2}\bar{\delta} - \bar{T}_2\right).$$

and the sample mean vector of the tail of 2nd $$\frac{h_1}{h_2}\bar{H}_1 + \frac{L}{h_2}\bar{\delta}$$

$\square$ is a variable which monitors the true change in the mean of the data distribution while monitors the noise. As a result, $$\lim_{n \to \infty} \mathcal{T}_{2nd-1st}^2(n) = \lim_{n \to \infty} [\mathcal{T}_{2nd}^2(n) - \mathcal{T}_{1st}^2(n)] \quad (24)$$

$$= \lim_{n \to \infty} \left[ \psi'\left(\frac{S_1^{2nd}}{h_2} + \frac{S_2^{2nd}}{t_2}\right)^{-1} \psi - \left(\phi - \frac{L}{t_1}\psi\right)' \left(\frac{S_1^{1st}}{h_1} + \frac{S_2^{1st}}{t_1}\right)^{-1} \left(\phi - \frac{L}{t_1}\psi\right) \right]$$

$$= \lim_{n \to \infty} \left[ \psi'\left(\frac{S_1^{2nd}}{h_2} + \frac{S_2^{2nd}}{n - h_2}\right)^{-1} \psi - \left(\phi - \frac{L}{n - h_1}\psi\right)' \left(\frac{S_1^{1st}}{h_1} + \frac{S_2^{1st}}{n - h_1}\right)^{-1} \left(\phi - \frac{L}{n - h_1}\psi\right) \right]$$

$$= \psi'\left(\frac{S_1^{2nd}}{h_2}\right)^{-1} \psi - \phi'\left(\frac{S_1^{1st}}{h_1}\right)^{-1} \phi,$$

Eq. 24 induces an upper and a lower bound for the value to which $\mathcal{T}_{2nd-1st}^2(n)$ will converge. Replacing both $\square$ and $\phi$ with the simultaneous confidence intervals in Eq. 24 gives us simultaneous confidence intervals on the limit of $\mathcal{T}_{2nd-1st}^2(n)$. Let $$\rho_k \in \pm \chi_{\alpha,p}^2 \sqrt{\frac{S_{2,kk}^{2nd}}{t_2}}$$

for $k = \{I, j\}$. As a result, the maximal expected value (i.e., the upper bound), $\mathcal{T}_{2nd-1st}^u$, of $\mathcal{T}_{2nd-1st}^2(n)$ is $$\lim_{n \to \infty} \mathcal{T}_{2nd-1st}^2(n) \leq \mathcal{T}_{2nd-1st}^u \quad (25)$$

$$= \sum_{i=1}^{p} \sum_{j=1}^{p} \max\left\{ \begin{array}{l} (\psi_i + \rho_i)\left(\frac{S_{1,ij}^{2nd}}{h_2}\right)^{-1}(\Psi_j + \rho_j) - \\ (\Phi_i + \rho_i)\left(\frac{S_{1,ij}^{1st}}{h_1}\right)^{-1}(\Phi_j + \rho_j) \end{array} \right\}$$

$$= \sum_{i=1}^{p} \sum_{j=1}^{p} \max\left\{ \left(\left(\frac{S_{1,ij}^{2nd}}{h_2}\right)^{-1} - \left(\frac{S_{1,ij}^{1st}}{h_1}\right)^{-1}\right)\rho_i\rho_j + \right.$$

$$\rho_i\left(\psi_j\left(\frac{S_{1,ij}^{2nd}}{h_2}\right)^{-1} - \phi_j\left(\frac{S_{1,ij}^{1st}}{h_1}\right)^{-1}\right) +$$

-continued $$\rho_j\left(\psi_i\left(\frac{S_{1,ij}^{2nd}}{h_2}\right)^{-1} - \phi_i\left(\frac{S_{1,ij}^{1st}}{h_1}\right)^{-1}\right) +$$

$$\left(\psi_i\psi_j\left(\frac{S_{1,ij}^{2nd}}{h_2}\right)^{-1} - \phi_i\phi_j\left(\frac{S_{1,ij}^{1st}}{h_1}\right)^{-1}\right)\right\}$$

Similarly, the minimal expected value (i.e. the lower bound), $T_{2nd-1st}^l$, of $T_{2nd-1st}^2(n)$ is:

$$\lim_{n\to\infty} T_{2nd-1st}^2(n) \geq T_{2nd-1st}^l \quad (26)$$

$$= \sum_{i=1}^p \sum_{j=1}^p \min\left\{\begin{array}{l}(\psi_i + \rho_i)\left(\frac{S_{1,ij}^{2nd}}{h_2}\right)^{-1}(\Psi_j + \rho_j) - \\ (\Phi_i + \rho_i)\left(\frac{S_{1,ij}^{1st}}{h_1}\right)^{-1}(\Phi_j + \rho_j)\end{array}\right\}$$

$$= \sum_{i=1}^p \sum_{j=1}^p \min\left\{\left(\left(\frac{S_{1,ij}^{2nd}}{h_2}\right)^{-1} - \left(\frac{S_{1,ij}^{1st}}{h_1}\right)^{-1}\right)\rho_i\rho_j + \right.$$

$$\rho_i\left(\psi_j\left(\frac{S_{1,ij}^{2nd}}{h_2}\right)^{-1} - \phi_j\left(\frac{S_{1,ij}^{1st}}{h_1}\right)^{-1}\right) +$$

$$\rho_j\left(\psi_i\left(\frac{S_{1,ij}^{2nd}}{h_2}\right)^{-1} - \phi_i\left(\frac{S_{1,ij}^{1st}}{h_1}\right)^{-1}\right) +$$

$$\left.\left(\psi_i\psi_j\left(\frac{S_{1,ij}^{2nd}}{h_2}\right)^{-1} - \phi_i\phi_j\left(\frac{S_{1,ij}^{1st}}{h_1}\right)^{-1}\right)\right\}$$

A possible improvement considers inducing confidence bounds on the difference between the test statistics of two time-windows instead of bounding a single test statistics of one time-window. Here, we choose to use Hotelling's $T^2$ test as a plug-in for our algorithm for detecting changes in univariate streams (i.e., p=1). Note that in this case, Eq. 25 can be written as:

$$\lim_{n\to\infty} T_{2nd-1st}^2(n) \leq T_{2nd-1st}^u \quad (27)$$

$$= \max\left\{(\psi + \rho)^2\left(\frac{S_1^{2nd}}{h_2}\right)^{-1} - (\phi + \rho)^2\left(\frac{S_1^{1st}}{h_1}\right)^{-1}\right\}$$

$$= \max\left\{\begin{array}{l}\left(\left(\frac{S_1^{2nd}}{h_2}\right)^{-1} - \left(\frac{S_1^{1st}}{h_1}\right)^{-1}\right)\rho^2 + \\ 2\left(\psi\left(\frac{S_1^{2nd}}{h_2}\right)^{-1} - \phi\left(\frac{S_1^{1st}}{h_1}\right)^{-1}\right)\rho + \\ \left(\psi^2\left(\frac{S_1^{2nd}}{h_2}\right)^{-1} - \phi^2\left(\frac{S_1^{1st}}{h_1}\right)^{-1}\right)\end{array}\right\}$$

Similarly, Eq. 26 can be written as:

$$\lim_{n\to\infty} T_{2nd-1st}^2(n) \geq T_{2nd-1st}^l \quad (28)$$

$$= \min\left\{\left(\left(\frac{S_1^{2nd}}{h_2}\right)^{-1} - \left(\frac{S_1^{1st}}{h_1}\right)^{-1}\right)\rho^2 + \right.$$

$$2\left(\psi\left(\frac{S_1^{2nd}}{h_2}\right)^{-1} - \phi\left(\frac{S_1^{1st}}{h_1}\right)^{-1}\right)\rho +$$

$$\left.\left(\psi^2\left(\frac{S_1^{2nd}}{h_2}\right)^{-1} - \phi^2\left(\frac{S_1^{1st}}{h_1}\right)^{-1}\right)\right\}$$

ProTO-$T^2$ (see Alg. 7) maintains a set of time-windows C. Every time-window i∈C has two pairs of aggregates: $T_i^h$ and $\omega_i^h$ for the head, and $T_i^t$ and $\omega_i^t$ for the tail. At the arrival of new observation, $x_n$, all the aggregates in the tail of time-window i are updated as follows: $T_i^t = T_i^t + x_n$ and $\omega_i^t = \omega_i^t + (x_n)^2$. Then, the algorithm recalculates $T^2(n)$ according to Eq. 20.

The last step taken after every new observation $x_n$, is to update the time-window set. A new time-window is first added to C, whose tail aggregates are zero and whose head aggregates are the sums of the respective head and tail aggregates of any one of the time-windows in C. Note that the sum of $T_i^h$ and $T_i^t$ is the same for all i, as is the sum of $\omega_i^h$ and $\omega_i^t$. For instance, let φ be the first time-window in C and therefore its head aggregates are computed as follows: $T_i^h \leftarrow T_\psi^h + T_\psi^t$ and $\omega_i^h \leftarrow T_\psi^h + \omega_\psi^t$.

The method in which ProTO-$T^2$ reviews the time-windows set and purges the unneeded time-windows is different from that of ProTO-T: For each pair of time-windows, 1st and 2nd in C, calculate the bounds $T_{2nd-1st}^l$ and $T_{2nd-1st}^u$ according to Eqs. 27 and 28 respectively. If $T_{2nd-1st}^l$ is lower than zero, remove time-window 2nd from C. Moreover, if $T_{2nd-1st}^l$ is greater than zero then remove time-window 1st from C. Lastly, the algorithm also checks whether the time-window max has passed the threshold λ. If it has, an alert is indicated with the suspected change point indicated to be max.

---

Algorithm 2 The ProTO-$T^2$ Algorithm

---

Input:
  Alert threshold λ
  Confidence α
  Input stream {$x_0, x_1, \ldots$}
Data structure:
  A time-window set C where every i ∈ C has two pair of aggregates: $T_i^h$ and $\omega_i^h$ for the head, and $T_i^t$ and $\omega_i^t$ for the tail.
  Initially C contains a dummy time-window −1 with $T_{-1}^h, \omega_{-1}^h, T_{-1}^t$ and $\omega_{-1}^t$ all set to zero.
Definitions:
  For every i ∈ C, $T_i^2(n)$ calculated according to Eq. 20.

$$\max \doteq \arg\max_{i \in C} T_i^2(n)\}$$

At the arrival of observation $x_n$:
1) Let $T_n^h \leftarrow T_{fst}^h + T_{fst}^t$ and $\omega_{fst}^h + \omega_{fst}^t$.
2) Let C ← C ∪ {n}
3) Let max ← min {i ∈ C}
4) For every i ∈ C such that i □ p > 40
  a) $T_i^t = T_i^t + x_n$ and $\omega_i^t = \omega_i^t + x_n x_n'$
  b) Recalculate $T_i^2(n)$
  c) If $T_i^2(n) > T_{max}^2(n)$ then max ← i
5) If $T_{max}^2(n) > λ$ then indicate of a possible change at observation max
6) For every different pair $1^{st}$, 2nd ∈ C such that $\{1^{st}, 2^{nd}\}$ − p > 40 and
  a) Calculate the bounds $T_{2nd-1st}^l$ and $T_{2nd-1st}^u$ according to Eqs. 28 and 27 respectively
  b) If $T_{2nd-1st}^u < 0$ then C ← C\{2nd}
  c) If $T_{2nd-1st}^l > 0$ then C ← C\{1st}

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A computerized method for detecting by a processor a change point in a data stream stored in memory by testing whether two sets of samples from the data stream were derived from the same distribution, wherein the test uses the unique convergence properties of the two sample tests to probabilistically find the point which maximizes their value, said point closely approximating the change point, said test comprising the steps of:
   (i) maintaining a list of candidate change points in the data stream, and relevant aggregate information;
   (ii) adding each new point in the data stream as candidate;
   (iii) computing an upper bound and a lower bound on the long term value of the two-sample test for every candidate in the list;
   (iv) purging from the list candidates whose long term upper bound value is lower than the long term lower bound values of other candidates, with high probability; and
   (v) indicating a change point when one candidate exceeds a given threshold.

2. The method according to claim 1, wherein the two-sample test used is the $\chi^2$ two-sample test.

3. The method according to claim 1, wherein the relevant aggregate information comprises the number of points, number of occurrence of data from different categories or other statistics which can be incrementally updated with every new sample.

4. The method according to claim 1, wherein the test used is the mean estimation algorithm.

5. The method according to claim 4, comprising the steps of:
   (i) maintaining the sum of the data and number of samples;
   (ii) updating the said sum and number with every new data;
   (iii) removing from said sum and number the sum and number of the data in the first set of the data for the candidate which indicates a change;
   (iv) using the current sum and number to compute the average which is the estimation for the mean; and
   (v) indicating a change point when the test value for one candidate exceeds a given threshold.

6. The method according to claim 1, wherein the test used is any two-sample test.

7. A computerized method for detecting by a processor a change point in a data stream stored in memory by testing whether two sets of samples from the data stream were derived from the same distribution, wherein the test uses the unique convergence properties of the two sample tests to probabilistically find the point which maximizes their value, said point closely approximating the change point, said test comprising the steps of:
   (i) maintaining a list of candidate change points in the data stream, and relevant aggregate information;
   (ii) adding each new point in the data stream as candidate;
   (iii) computing an upper bound and a lower bound on the long term value of the Student's-t two-sample test for every candidate in the list;
   (iv) purging from the list candidates whose long term upper bound value is lower than the long term lower bound values of other candidates, with high probability; and
   (v) indicating a change point when the test value for one candidate exceeds a given threshold.

8. The method according to claim 7, wherein the aggregate relevant information comprises the number of point, sum of data, sum of the square of the data or other statistics which can be incrementally updated with every new sample.

9. A non-transitory computer-usable medium having computer readable instructions stored thereon for execution by a processor to perform a computerized method for detecting a change point in a data stream by testing whether two sets of samples from the data stream were derived from the same distribution, wherein the test uses the unique convergence properties of the two sample tests to probabilistically find the point which maximizes their value, said point closely approximating the change point, comprising the steps of:
   (i) maintaining a list of candidate change points in the data stream, and relevant aggregate information;

(ii) adding each new point in the data stream as candidate;
(iii) computing an upper bound and a lower bound on the long term value of the two-sample test for every candidate in the list;
(iv) purging from the list candidates whose long term upper bound value is lower than the long term lower bound values of other candidates, with high probability; and
(v) indicating a change point when one candidate exceeds a given threshold.

10. The medium according to claim 9, wherein the test used is the $\chi^2$ two-sample test.

11. The medium according to claim 9, wherein the relevant aggregate information comprises the number of point, number of occurrence of data from different categories or other statistics which can be incrementally updated with every new sample.

12. The medium according to claim 9, wherein the test used is the Student's t-test.

13. The medium according to claim 12, comprising the steps of:
(i) maintaining a list of candidate change points in the data stream, and relevant aggregate information;
(ii) adding each new point in the data stream as candidate;
(iii) computing an upper bound and a lower bound on the long term value of the Student's-t two-sample test for every candidate in the list;
(iv) purging from the list candidates whose long term upper bound value is lower than the long term lower bound values of other candidates, with high probability; and
(v) indicating a change point when the test value for one candidate exceeds a given threshold,
wherein the relevant aggregate information comprises the number of point, sum of data, sum of the square of the data or other statistics which can be incrementally updated with every new sample.

14. The medium according to claim 9, wherein the test used is the mean estimation algorithm.

15. The medium according to claim 14, comprising the steps of:
(i) maintaining the sum of the data and number of samples;
(ii) updating the said sum and number with every new data;
(iii) removing from said sum and number the sum and number of the data in the first set of the data for the candidate which indicates a change;
(iv) using the current sum and number to compute the average which is the estimation for the mean; and
(v) indicating a change point when the test value for one candidate exceeds a given threshold.

16. The medium according to claim 9, wherein the test used is any two-sample test.

* * * * *